(12) United States Patent
Tanizaki et al.

(10) Patent No.: US 7,688,228 B2
(45) Date of Patent: Mar. 30, 2010

(54) MAP DATA DELIVERING DEVICE, COMMUNICATION TERMINAL, AND MAP DELIVERING METHOD

(75) Inventors: Masaaki Tanizaki, Nishitokyo (JP);
Atsushi Hiroike, Kawagoe (JP);
Shigeru Shimada, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 347 days.

(21) Appl. No.: 11/632,838

(22) PCT Filed: Apr. 27, 2005

(86) PCT No.: PCT/JP2005/008037

§ 371 (c)(1),
(2), (4) Date: Jun. 7, 2007

(87) PCT Pub. No.: WO2006/011278

PCT Pub. Date: Feb. 2, 2006

(65) Prior Publication Data

US 2007/0282524 A1 Dec. 6, 2007

(30) Foreign Application Priority Data

Jul. 29, 2004 (JP) .............................. 2004-221627

(51) Int. Cl.
*G08G 1/123* (2006.01)
(52) U.S. Cl. ............................ 340/995.12; 340/995.11; 340/995.18
(58) Field of Classification Search ............ 340/995.12, 340/995.1, 995.11, 995.14, 995.18
See application file for complete search history.

(56) References Cited

U.S. PATENT DOCUMENTS 5,614,895 A * 3/1997 Ohomori et al. ....... 340/995.15

(Continued)

FOREIGN PATENT DOCUMENTS

JP 2000-036097 7/1998

(Continued)

OTHER PUBLICATIONS

International Search Report of PCT/JP2005/008037 mailed Jul. 26, 2005.

*Primary Examiner*—Travis R Hunnings
(74) *Attorney, Agent, or Firm*—Stites & Harbison PLLC; Juan Carlos A. Marquez, Esq.

(57) ABSTRACT

An updated part of map data is delivered while suppressing unwanted communication traffic and preventing contradiction in the updated map. A map delivering server (10) comprises a map data storage section (102) storing link data including the update dates and times and update infection range for each link, a network IF section (101) for receiving from a navigation terminal (20) a map delivery request containing the requested area of map delivery and the previous request data and time of map delivery of the requested area, and a map element search section (103) for searching the map data storage section (102) for the link data associated with the update infection range including the link at least a part of which belongs to the requested area of the map delivery request and associated with the update date and time later than the previous request date and time contained in the map delivery request. The link data found by the map element search section (103) is sent to the navigation terminal (20) through the network IF section (101).

19 Claims, 22 Drawing Sheets

U.S. PATENT DOCUMENTS

| | | |
|---|---|---|
| 6,704,649 B2 * | 3/2004 | Miyahara .................... 701/208 |
| 6,915,206 B2 * | 7/2005 | Sasajima .................... 701/208 |
| 2006/0106534 A1 | 5/2006 | Kawamata et al. |

FOREIGN PATENT DOCUMENTS

| | | |
|---|---|---|
| JP | 2003-044992 | 7/2001 |
| JP | 2004-004240 | 5/2002 |
| JP | 2004-077254 | 8/2002 |
| JP | 2004-125553 | 10/2002 |
| JP | 2004-178248 | 11/2002 |
| JP | 2004-077459 | 12/2002 |
| JP | 2004-205994 | 12/2002 |

* cited by examiner

FIG. 2

MAP DATA STORING UNIT 102

| ID (1021) | ROAD WIDTH (1022) | ROAD WIDTH MODIFICATION DATE/TIME (1023) | ROAD CLASS FLAG (1024) | CLASS MODIFICATION DATE/TIME (1025) | POINT SEQUENCE DATA (1026) | POINT SEQUENCE MODIFICATION DATE/TIME (1027) | UPDATE PROPAGATION RANGE (POINT SEQUENCE DATA) (1028) | RECORD CREATION DATE/TIME (1029) | RECORD DELETION DATE/TIME (1030) |
|---|---|---|---|---|---|---|---|---|---|
| 0001 | 10 | '04/9/1 | 10 | - | {x1,y1,...} | - | {x1,y1,...}, {x1,y1,...},... | '04/1/1 | - |
| 0002 | 10 | - | 10 | - | {x1,y1,...} | - | {x'1,y'1,...}, {x1,y1,...},... | '04/1/1 | - |
| 0003 | 5 | - | 5 | - | {x"1,y"1,...} | - | {x"1,y"1,...},... | '02/3/1 | '04/1/1 |
| ⋮ | ⋮ | ⋮ | ⋮ | ⋮ | ⋮ | ⋮ | ⋮ | ⋮ | ⋮ |

FIG. 3

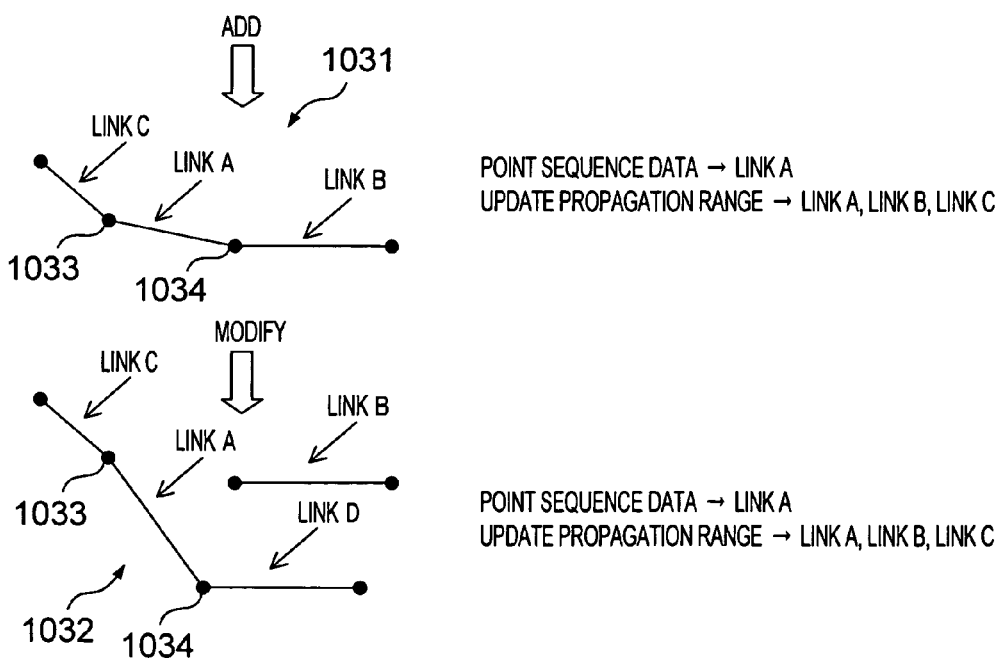

POINT SEQUENCE DATA → LINK A
UPDATE PROPAGATION RANGE → LINK A, LINK B, LINK C

POINT SEQUENCE DATA → LINK A
UPDATE PROPAGATION RANGE → LINK A, LINK B, LINK C

UPDATE MANAGEMENT DATA STORING UNIT 203

| ID 2031 | PREVIOUS REQUEST DATE/TIME 2032 | REQUEST CYCLE 2033 | REQUESTED AREA 2034 |
|---|---|---|---|
| 0001 | '04/5/1 | A MONTH | AREA A |
| 0002 | '04/1/1 | THREE MONTHS | AREA B |
| 0003 | '04/1/1 | SIX MONTHS | AREA C |
| ⋮ | ⋮ | ⋮ | ⋮ |

FIG. 6

MAP DELIVERY REQUEST 2020

| ADDRESS INFORMATION 2023 | PREVIOUS REQUEST DATE/TIME 2021 | REQUESTED AREA 2022 |

FIG. 7

MAP DATA STORING UNIT 206

| ID 2061 | ROAD WIDTH 2062 | ROAD CLASS FLAG 2063 | POINT SEQUENCE DATA 2064 |
|---|---|---|---|
| 0001 | 10 | 10 | {x1,y1,....} |
| 0002 | 10 | 10 | {x'1,y'1,....} |
| 0003 | 5 | 5 | {x"1,y"1,....} |
| ⋮ | ⋮ | ⋮ | ⋮ |

2060

UPDATE MANAGEMENT DATA RECEPTION SCREEN

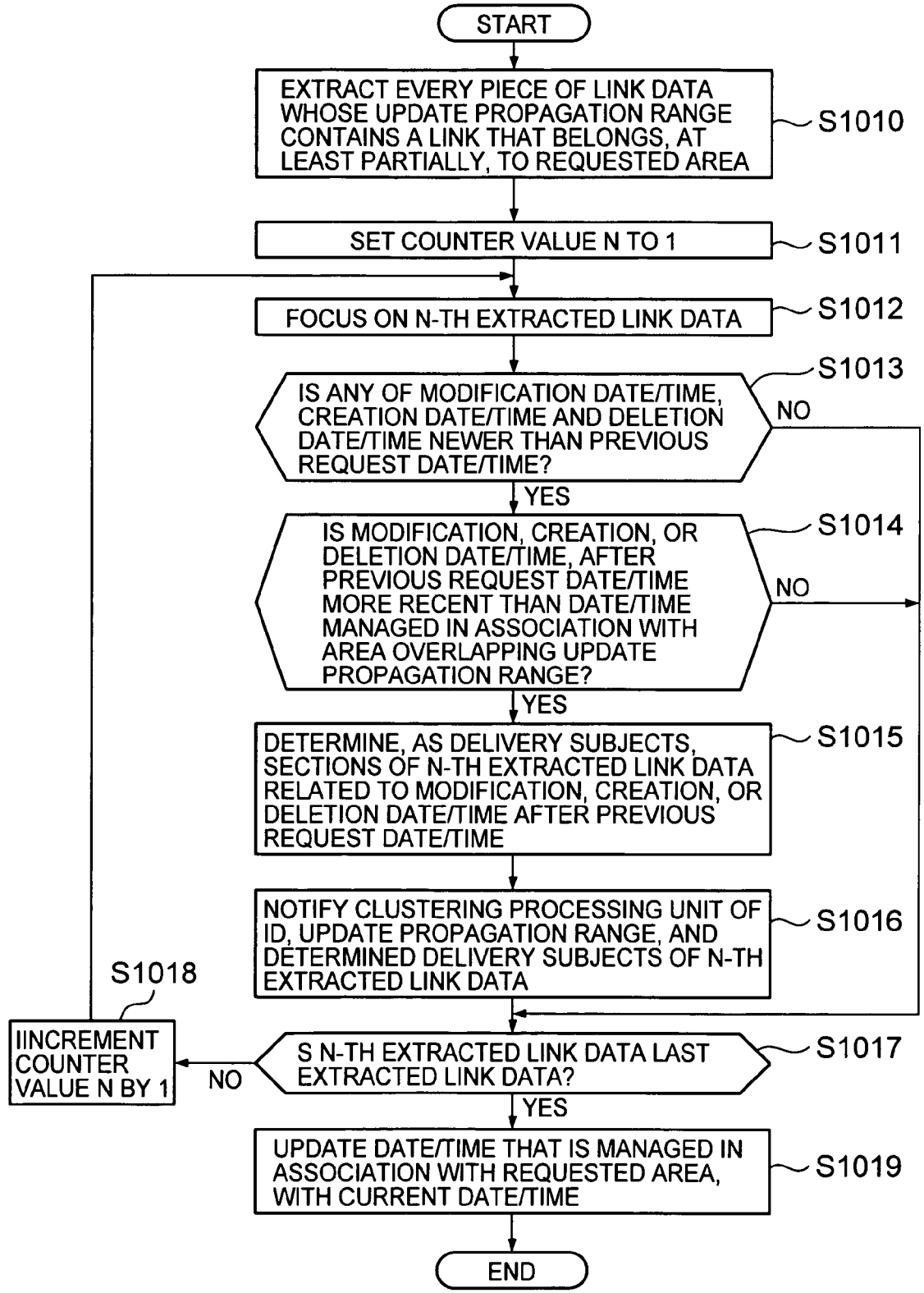

CLUSTERING FOR EACH UPDATE PROPAGATION RANGE; MAP DELIVERY

TEMPORARY ACCUMULATION, UPDATE REFLECTION

FIG. 18

MAP DATA STORING UNIT 102

| ID | ROAD WIDTH | ROAD TYPE FLAG | POINT SEQUENCE DATA | UPDATE PROPAGATION RANGE (POINT SEQUENCE DATA) | RECORD MODIFICATION DATE/TIME | RECORD CREATION DATE/TIME | RECORD DELETION DATE/TIME |
|---|---|---|---|---|---|---|---|
| 0001 | 10 | 10 | {x1,y1,....} | {x1,y1,....}, {x'1,y'1,....}, ... | - | '04/1/1 | - |
| 0002 | 10 | 10 | {x'1,y'1,....} | {x'1,y'1,....}, {x1,y1,....}, ... | - | '04/1/1 | - |
| 0003 | 5 | 10 | {x"1,y"1,....} | {x"1,y"1,....}, ... | - | '02/3/1 | '04/1/1 |
| ⋮ | ⋮ | ⋮ | ⋮ | ⋮ | ⋮ | ⋮ | ⋮ |

Columns: 1021, 1022, 1024, 1026, 1028, 1031, 1029, 1030

FIG. 19

MAP DATA STORING UNIT 206

| ID | AREA (MESH CELL) | LINK DATA SEQUENCE |
|---|---|---|
| 0001 | {(x1,y1), (x2,y2).} | {road1,road2,....} |
| 0002 | {(x'1,y'1), (x'2,y'2)} | {road'1,road'2,....} |
| 0003 | {(x"1,y"1), (x"2,y"2)} | {road"1,road"2,....} |
| ⋮ | ⋮ | ⋮ |

Columns: 2065, 2066, 2067, 2068

NAVIGATION TERMINAL 20

MAP DELIVERY SERVER 10

AREA MANAGEMENT OF MESH CELLS

FIG. 26

SEARCH SUBJECT AREA LIST

| NUMBER 2601 | SEARCH COMPLETION FLAG 2602 | AREA (MESH CELL) 2603 | PREVIOUS UPDATE DATE/TIME 2604 |
|---|---|---|---|
| 1 | UNFINISHED | {(x1,y1),(x2,y2).} | '04/5/1 |
| 2 | UNFINISHED | {(x'1,y'1),(x'2,y'2)} | '04/5/1 |
| ... | ... | ... | ... |

FIG. 28
PROCESSING OF DRAWING GRAPHIC OF UPDATE
AREA LEADING TO DISTANT DESTINATION
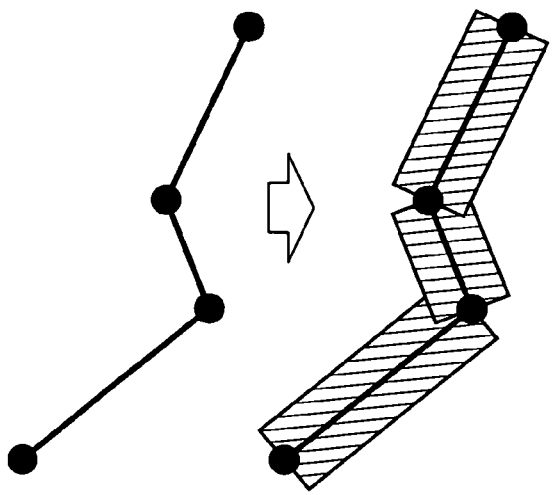
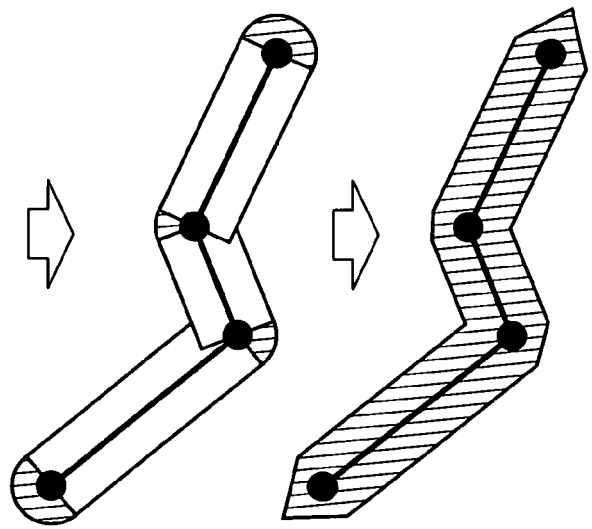
FIGURE OF CENTER LINE TO WHICH ROUTE ROADS ARE CONNECTED
S2801
BROADEN SEGMENT TOWARD BOTH EDGES TO FORM A RECTANGLE
S2802
DRAW ARC AT BEND
S2803
APPROXIMATE ARC TO REGULAR N-POLYGON

FIG. 29

MANAGEMENT OF UPDATE AREA LEADING TO
DISTANT DESTINATION

UPDATE MANAGEMENT DATA STORING UNIT TO
WHICH LEVEL-SPECIFYING DESCRIPTION IS ADDED 203

| ID 2031 | PREVIOUS REQUEST DATE/TIME 2032 | REQUEST CYCLE 2033 | REQUESTED AREA 2034 | LEVEL 2035 |
|---|---|---|---|---|
| 0001 | '04/5/1 | ONE MONTH | AREA A | 1,2,3 |
| 0002 | '04/1/1 | THREE MONTHS | AREA B | 2,3 |
| ... | ... | ... | ... | ... |
| 0004 | '04/2/1 | SIX MONTHS | AREA D1 | 1,2,3 |
| 0005 | '04/2/1 | SIX MONTHS | AREA D2 | 1,2,3 |
| 0006 | '04/2/1 | SIX MONTHS | AREA D3 | 2,3 |
| ⋮ | ⋮ | ⋮ | ⋮ | ⋮ | ns

MAP DATA DELIVERING DEVICE, COMMUNICATION TERMINAL, AND MAP DELIVERING METHOD

TECHNICAL FIELD

The present invention relates to a technique of delivering map data.

BACKGROUND ART

Patent Document 1 and Patent Document 2 disclose techniques of delivering map data from a server to a terminal such as a navigation system on a basis of mesh cells. Patent Document 3 discloses a technique in which, when for instance a moving object is traveling on a new road unregistered in map data, a terminal mounted to the moving object sends coordinate data for identifying the road to a server and the server updates master map data using the coordinate data of the new road that has been sent from the terminal.

Patent Document 1: JP 2003-044992 A
Patent Document 2: JP 2004-077254 A
Patent Document 3: JP 2004-004240 A

DISCLOSURE OF THE INVENTION

Problem to be Solved by the Invention

With the techniques described in Patent Document 1 and Patent Document 2, a server delivers data of all map components that belong to a mesh cell to a terminal even when only one of the map components belonging to the mesh cell (e.g., one section of a road) is modified. The delivery of data of unmodified map components along with data of the modified element increases communication traffic unnecessarily. Also, when for instance a modified zone of a road straddles two adjacent mesh cells, delivery to the two adjacent mesh cells is different, causing a temporary loss of continuity of the road, thus making the road unavailable for navigation processing such as route search and route navigation in some cases.

The technique described in Patent Document 3, on the other hand, allows a terminal to send, to a server, map data with an added or modified road along which the terminal is traveling as a unit. However, this technique does not consider other map constituent components that are affected by the added/modified road (e.g., other roads whose connection relation is changed due to the added/modified road), thus making the road unavailable for navigation processing, such as route search and route navigation. This technique is for building map data for GIS (Geographic Information System), and has not been developed in consideration of an application to map delivery for navigation purposes.

The present invention has been made in view of the above-mentioned circumstances, and an object of the present invention is therefore to provide a technique of delivering an updated part of map data in a manner that prevents unnecessary communication traffic and avoids inconsistencies in the map after an update.

Means for Solving the Problem

To solve the above-mentioned problem, in the present invention, a map data delivering device sends, to a communication terminal, updated map component data of a map component when the updated map component data of the map component and at least a part of map component data of other map components that are affected by this map component change, belong to an area intended for map data delivery.

The map data delivering device of the present invention comprises, for example: a map data storage method which stores, for each map component, map data composed of map component data of the map component, update date data of the map component data of the map component, and update propagation range data containing the map component data of the map component and map component data of other map components that are affected by a change in the map component; a map delivery request receiving means which receives from the communication terminal a map delivery request containing area information and date/time information, the area information indicating an area, a map of which is requested to be delivered, the date/time information indicating the previous date/time when a map delivery request has been made about the area; a map component retrieving means which searches the map data storage method for such map component data that is associated with update propagation range data containing map component data that belongs, at least partially, to an area indicated by the area information contained in the map delivery request, and with update date data indicating a date/time that is newer than the one in the date/time information contained in the map delivery request; and a map component delivering means which sends, to the communication terminal, the map component data searched for by the map component retrieving means.

The communication terminal of the present invention comprises, for example: a map data storage method which stores, for each map component, map data composed of map component data of the map component; a map delivery request method which sends a map delivery request to the map data delivering device and in return receives map component data from the map data delivering device, the map delivery request containing area information and date/time information, the area information indicating an area of which a map is requested to be delivered, the date/time information indicating the previous date/time when a map delivery request has been made about the area; and a map data updating means which updates map data stored in the map data storage method by using the map component data received from the map data delivering device.

EFFECT OF THE INVENTION

According to the present invention, an updated part of map data can be delivered while preventing unnecessary communication traffic and avoiding inconsistencies in the updated map.

BRIEF DESCRIPTION OF THE DRAWINGS

FIG. 2 shows an example of what is registered in a map data storing unit (102).

FIG. 3 is a diagram illustrating an update propagation range of a link.

FIG. 6 is a diagram illustrating a data configuration example of a map delivery request.

FIG. 7 is a diagram showing an example of what is registered in a map data storing unit (206).

FIG. 12 is a diagram illustrating the operation flow of S101 (difference extraction) which is shown in FIG. 10.

FIG. 18 is a diagram showing another example of what is registered in the map data storing unit (102).

FIG. 19 is a diagram showing an example of what is registered in a map data storing unit (206).

FIG. 26 is a diagram showing a configuration example of a search subject area list, which is used in the flow shown in FIG. 25.

FIG. 28 is a diagram illustrating processing of creating a graphic of an update area that leads to a distant destination.

FIG. 29 is a diagram obtained by expanding FIG. 4 such that a level where difference extraction is performed can be described for each update area.

DESCRIPTION OF REFERENCE NUMERALS

10: map delivery server, 20: navigation terminal, 30: wireless communication processor, 40: network, 50: wireless communication base station, 101: network interface unit, 102: map data storing unit, 103: map component retrieving unit, 104: clustering processing unit, 105: request history management unit, 106: update management unit, 201: network interface unit, 202: delivery requesting unit, 203: update management data storing unit, 204: incremental update processing unit, 205: temporary accumulation unit, 206: map data storing unit, 207: navigation processing unit, 208: update area receiving unit, 209: GUI (graphical user interface) unit

BEST MODE FOR CARRYING OUT THE INVENTION

Embodiments of the present invention will be described below.

First Embodiment

Figure 1:
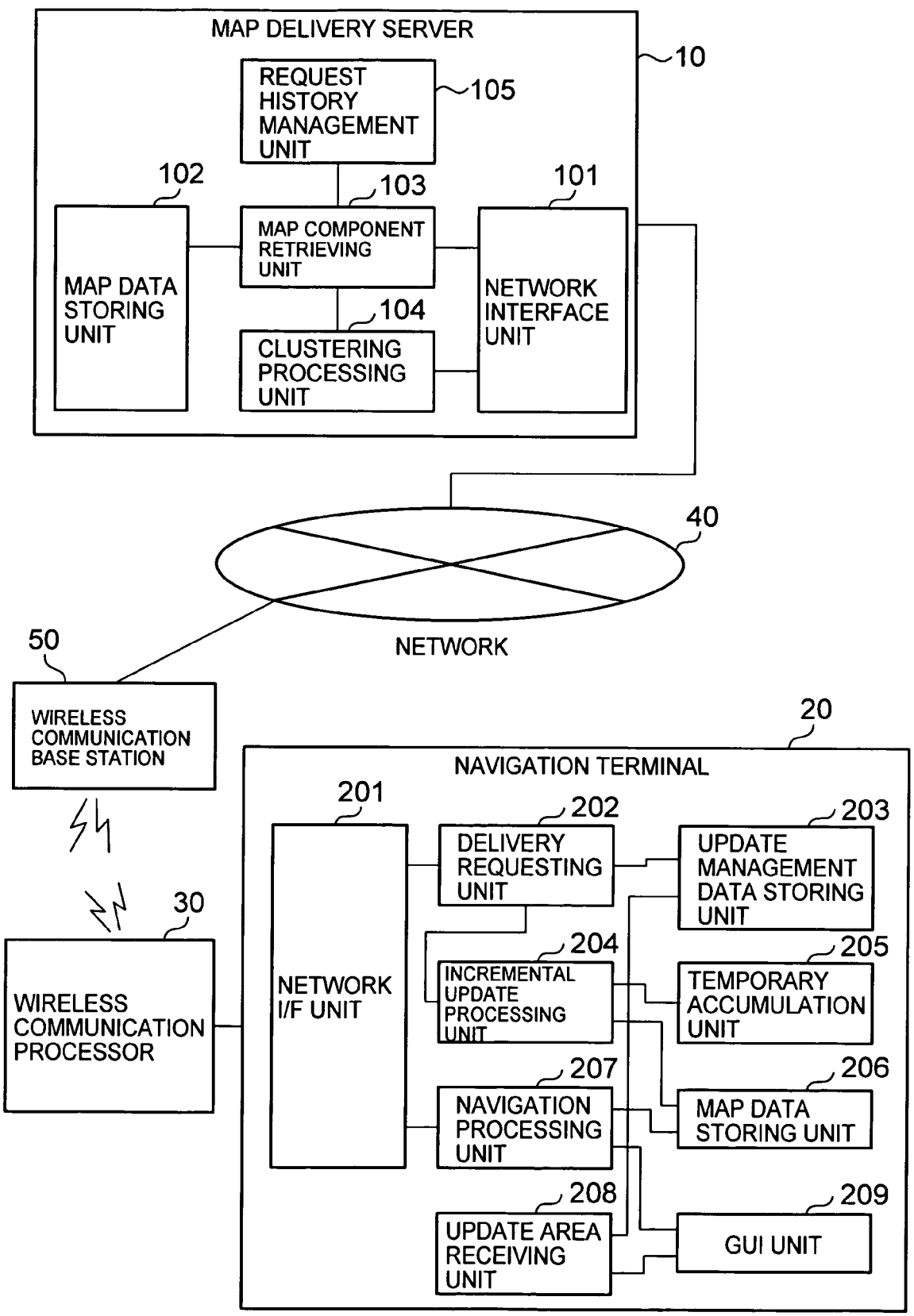
FIG. 1 is a schematic diagram showing a map data delivery system to which a first embodiment of the present invention is applied.

FIG. 1 is a schematic diagram of a map data delivery system to which a first embodiment of the present invention is applied. As shown in the drawing, the map data delivery system of this embodiment has a map delivery server 10, which is connected to a network 40, and a navigation terminal 20. A wireless communication processor 30 is connected to the navigation terminal 20. The wireless communication processor 30 connects the navigation terminal 20 to the network 40 via a wireless communication base station 50. The wireless communication processor 30 may be built into the navigation terminal 20.

The map delivery server 10 delivers an updated part of map data to the navigation terminal 20 in response to a map delivery request received from the navigation terminal 20. As shown in the drawing, the map delivery server 10 has a network interface unit 101, which is for connecting the map delivery server 10 to the network 40, a map data storing unit 102, a map component retrieving unit 103, a clustering processing unit 104, and a request history management unit 105.

The map data storing unit 102 stores link data of links constituting a road on a map. FIG. 2 shows an example of what is registered in the map data storing unit 102. As shown in the drawing, each link data record 1020 is composed of a field 1021 for registering an ID with which a link is identified, a field 1022 for registering the road width of the link, a field 1023 for registering a date/time when the road width (field 1022) is modified, a field 1024 for registering a flag that indicates the road class of the link, such as a normal road or a toll road, a field 1025 for registering a date/time when the road class (field 1024) is modified, a field 1026 for registering point sequence data, which is coordinate data of a sequence of points representing the position and shape of the link (a sequence of points that is made up of a start node, an end node, and an intermediate node located at each bend or the like of the link), a field 1027 for registering a date/time when the point sequence data (field 1026) is modified, a field 1028 for registering point sequence data of links that constitute the update propagation range of the link, a field 1029 for registering a date/time when the record 1020 is created, and a field 1030 for registering a date/time when the record 1020 is deleted.

The update propagation range of a link refers to a range containing the link and other links whose connected relation is affected by a change (addition, modification, removal, or the like) in this link. FIG. 3 is a diagram illustrating the update propagation range of a link. In the drawing, a road 1031 constituted of links A to C is newly added. The link A has a start node 1033, which is connected to the link C, and an end node 1034, which is connected to the link B. An addition of the link A affects the connection of the links B and C. The update propagation range of the link A therefore contains the links A, B, and C. The road 1031 is changed to a road 1032 by switching the connection of the end node 1034 of the link A from the link B to a link D. The modification of the link A affects the connection of the links B and D. The update request range of the link A in this case therefore contains the links A, B, and D.

The request history management unit 105 manages, for each area, a map of which is requested to be delivered, the previous date/time when a map delivery request is received from the navigation terminal 20 via the network interface unit 101.

The map component retrieving unit 103 searches the map data storing unit 102 for such link data that is associated with an update propagation range containing a link that belongs, at least partially, to an area, a map of which is requested to be delivered by a map delivery request received from the navigation terminal 20, and with a modification date/time, a creation date/time, or a deletion date/time that is newer than the previous request date/time specified by the map delivery request, the modification date/time, creation date/time, or deletion date/time of the link data being newer than any date/time managed by the request history management unit 105 in association with each area that is covered by this update propagation range.

The clustering processing unit 104 groups, by update propagation range, link data to be delivered via the network interface unit 101 to the navigation terminal 20 (clustering), and sends the data to the navigation terminal 20 group by group.

Figure 9:
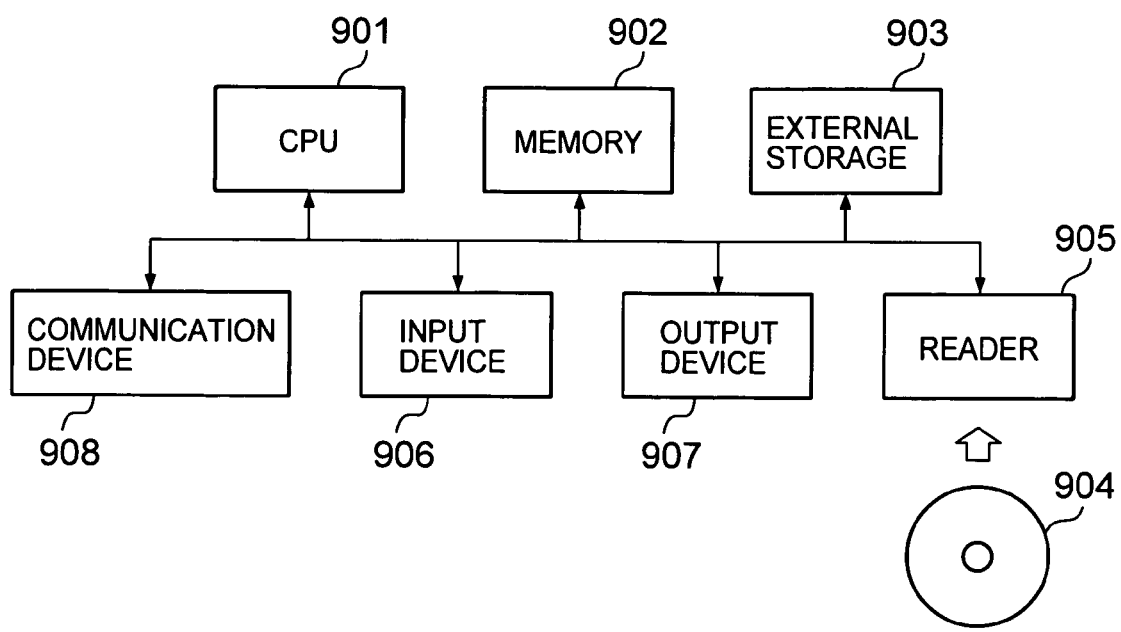
FIG. 9 is a diagram showing a hardware configuration example for a map delivery server (10) and a navigation terminal (20).

The map delivery server 10 described above is realized by preparing a computer system as shown in FIG. 9, which has a CPU 901, a memory 902, an HDD or other types of external storage 903, a reader 905 for reading information out of a portable storage medium 904 such as CD-ROM or DVD-ROM, an input device 906 such as a keyboard and/or a mouse, an output device 907 such as a display, and a communication device 908 for connecting to a communication network, and having the CPU 901 run a given program which is loaded into the memory 902. The given program is downloaded from the storage medium 904 via the reader 905, or from the network via the communication device 908, to the external storage 903 and then loaded into the memory 902 to be executed by the CPU 901. Alternatively, the given program may be loaded from the storage medium 904 via the reader 905, or from the network via the communication device 908, directly into the memory 902 to be executed by the CPU 901. In this case, the memory 902, the external storage 903, or the storage medium 904 is used as the map data storing unit 102.

The navigation terminal 20 performs navigation processing such as map display, route search, and route navigation using map data it holds. The navigation terminal 20 also sends to the map delivery server 10 a map delivery request containing an area, a map of which is requested to be delivered, and a date/time specified as the previous request date/time of this area. The navigation terminal 20 obtains map data from the map delivery server 10, and makes its own map data reflect the obtained map data. As shown in the drawing, the navigation terminal 20 is composed of a network interface unit 201, which connects the navigation terminal 20 via the wireless communication processor 30 and the wireless communication base station 50 to the network 40, a delivery requesting unit 202, an update management data storing unit 203, a incremental update processing unit 204, a temporary accumulation unit 205, a map data storing unit 206, a navigation processing unit 207, an update area receiving unit 208, and a GUI (Graphical User Interface) unit 209, which displays information to a user and receives instructions from a user.

Figures 4, 5:
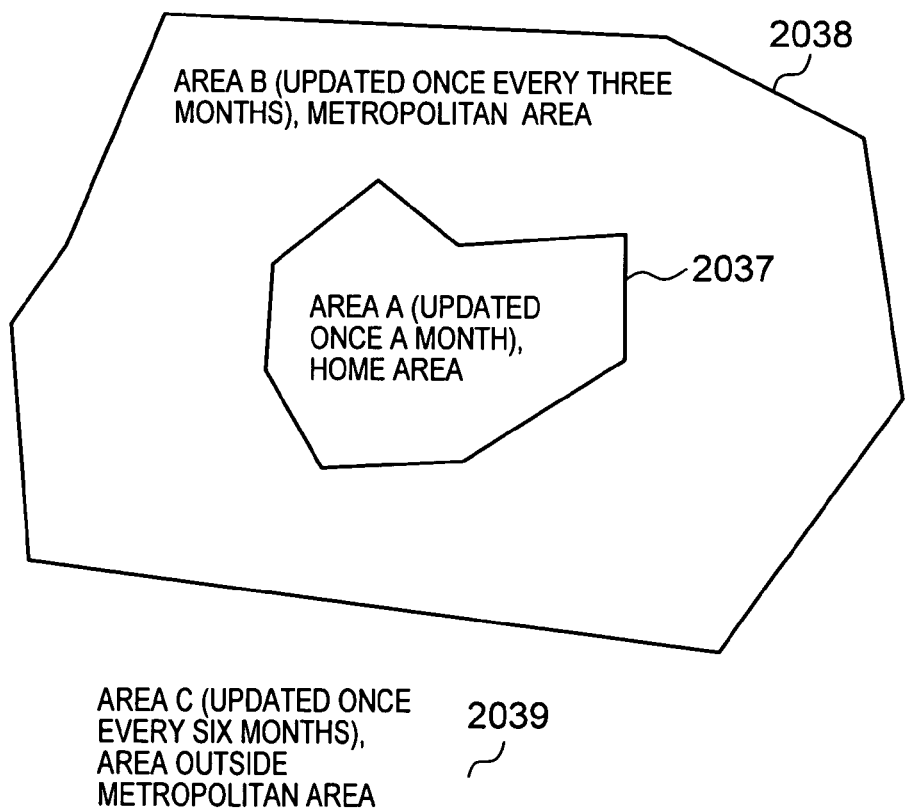
FIG. 4 is a diagram showing an example of what is registered in an update management data storing unit (203).
FIG. 5 is a diagram illustrating the correlation between pieces of update management data stored in the update management data unit (203).

The update management data storing unit 203 stores, for each area, a map of which is requested to be delivered, update management data, which is data necessary to judge when to issue a map delivery request to the area. FIG. 4 shows what is registered in the update management data storing unit 203. As shown in the drawing, each update management data record 2030 is composed of a field 2031 for registering an ID with which update management data in question is identified, a field 2032 for registering a date/time when a map delivery request was previously made in accordance with this update management data, a field 2033 for registering a request cycle at which map delivery is requested in accordance with this update management data, and a field 2034 for registering information with which an area, a map of which is requested to be delivered, is identified.

Information used to identify an area, a map of which is requested to be delivered, is, when the area is circular, for example, coordinates at the center of the circle and the radius (or the diameter). When the area is rectangular, the coordinates of two apexes at opposing corners are employed as the identification information. When the area is polygonal, the coordinates of each apex of the polygon are employed as the identification information. Pieces of update management data stored in the update management data storing unit 203 have, in this embodiment, a relation shown in FIG. 5. In other words, areas 2037 to 2039 have different sizes, and each contain an area smaller than its own area. In the areas 2037 to 2039, a smaller area has a shorter request cycle (issues requests more frequently).

The delivery requesting unit 202 monitors pieces of update management data stored in the update management data storing unit 203 to detect update management data that has passed the request cycle registered in the field 2033 since the previous request date/time registered in the field 2032. Upon detecting such update management data, the delivery requesting unit 202 creates a map delivery request 2020 containing, as shown in FIG. 6, a previous request date/time 2021 and requested area identification information 2022, which are registered in the fields 2032 and 2034 of the detected update management data. The map delivery request 2020 also contains address information 2023 including the address of the map delivery server 10 to which the map delivery request 2020 is sent and the address of the navigation terminal 20 from which the map delivery request 2020 is sent. The delivery requesting unit 202 sends the created map delivery request 2020 to the map delivery server 10 via the network interface unit 201. The delivery requesting unit 202 then updates the previous request date/time registered in the field 2032 of the detected update management data with the current date/time. The delivery requesting unit 202 also receives, from the map delivery server 10, link data grouped by update propagation range, and hands the received link data over to the incremental update processing unit 204.

The incremental update processing unit 204 temporarily accumulates, in the temporary accumulation unit 205, link data received from the delivery requesting unit 202. At a given timing such as when the navigation terminal 20 is idle, the incremental update processing unit 204 makes the map data storing unit 206 reflect, group by group, the grouped link data accumulated in the temporary accumulation unit 205.

The map data storing unit 206 stores link data of links constituting a road on a map. FIG. 7 shows what is registered in the map data storing unit 206. As shown in the drawing, each link data record 2060 is composed of a field 2061 for registering an ID with which a link is identified, a field 2062 for registering the road width of the link, a field 2063 for registering a flag that indicates the road class of the link, such as a normal road or a toll road, and a field 2064 for registering point sequence data, which is coordinate data of a sequence of points representing the shape of the link (a sequence of points that is made up of a start node, an end node, and an intermediate node located at each bend or the like of the link). The navigation processing unit 207 performs navigation processing such as map display, route search, and route navigation using link data that is stored in the map data storing unit 206.

Figure 8:
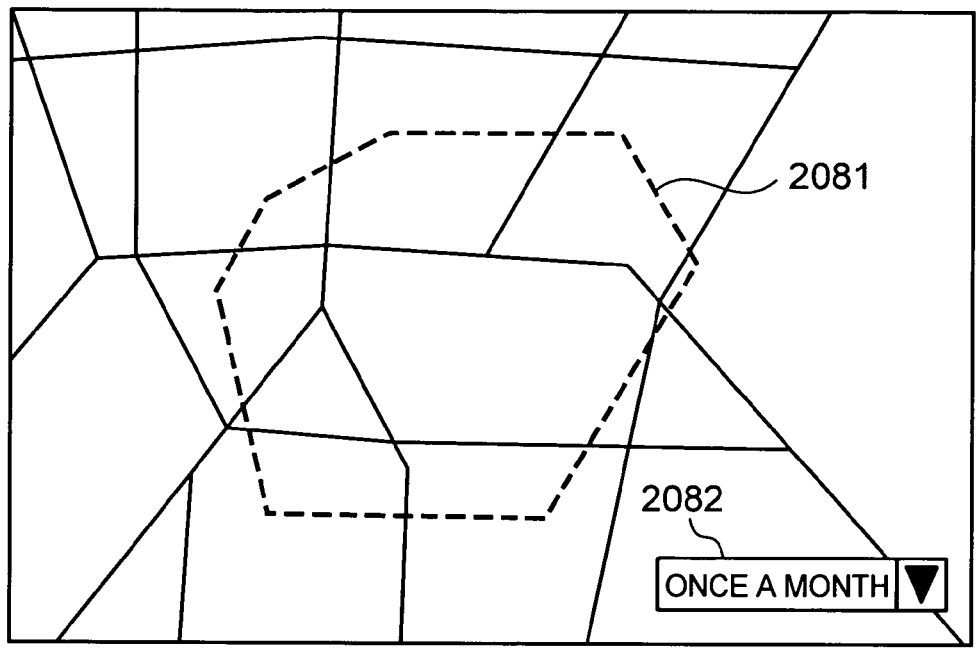
FIG. 8 is a diagram showing an example of an update management data reception screen, which is displayed on a GUI unit (209) by an update area receiving unit (208).

The update area receiving unit 208 receives, from a user, via the GUI unit 209, update management data to be stored in the update management data recording unit 203. FIG. 8 shows an example of an update management data reception screen displayed on the GUI unit 209 by the update area receiving unit 208. Through the update management data reception screen as shown in the drawing, the update area receiving unit 208 receives from a user an instruction that designates an area 2081. When the area is circular, for example, the coordinates of the center of the circle are specified on the screen through touch panel operation, cursor operation, or the like, and the radius (or the diameter) is entered through key operation or the like. When the area is rectangular, the coordinates of two apexes at opposite corners are specified on the screen through touch panel operation, cursor operation, or the like. When the area is polygonal, the coordinates of each apex of the polygon are specified on the screen through touch panel operation, cursor operation, or the like. A desired request cycle is also entered in a selection field 2082 with the use of, for example, a pull-down menu. Once an area and a request cycle are specified in the manner described above, the update area receiving unit 208 adds a new record 2030 to the update management data recording unit 203. In the newly added record 2030, a unique ID is registered in the field 2031 whereas the specified request cycle and the specified area are registered in the fields 2033 and 2034, respectively. Registered in the field 2032 as the default value is, for example, a date/time when the navigation terminal is put into operation for the first time or, more practically, a date/time when the user signs up for the service. Ideally, the date/time of update of map data that is registered in the map data storing unit upon shipment of the navigation terminal is registered as the default value.

The above-described navigation terminal 20 is realized by adding, to a computer system with a configuration as shown in FIG. 9 (the reader 905 may be omitted), an I/O device for exchanging information with a GPS receiver and/or various sensors such as an orientation sensor and a velocity sensor, and having the CPU 901 run a given program which is loaded into the memory 902. The given program can be downloaded from the storage medium 904 via the reader 905, or from the network via the communication device 908, to the external storage 903 and then loaded into the memory 902 to be executed by the CPU 901. In this case, the memory 902 or the external storage 903 is used as the update management data storing unit 203, the temporary accumulation unit 205, and the map data storing unit 206.

Figure 10:
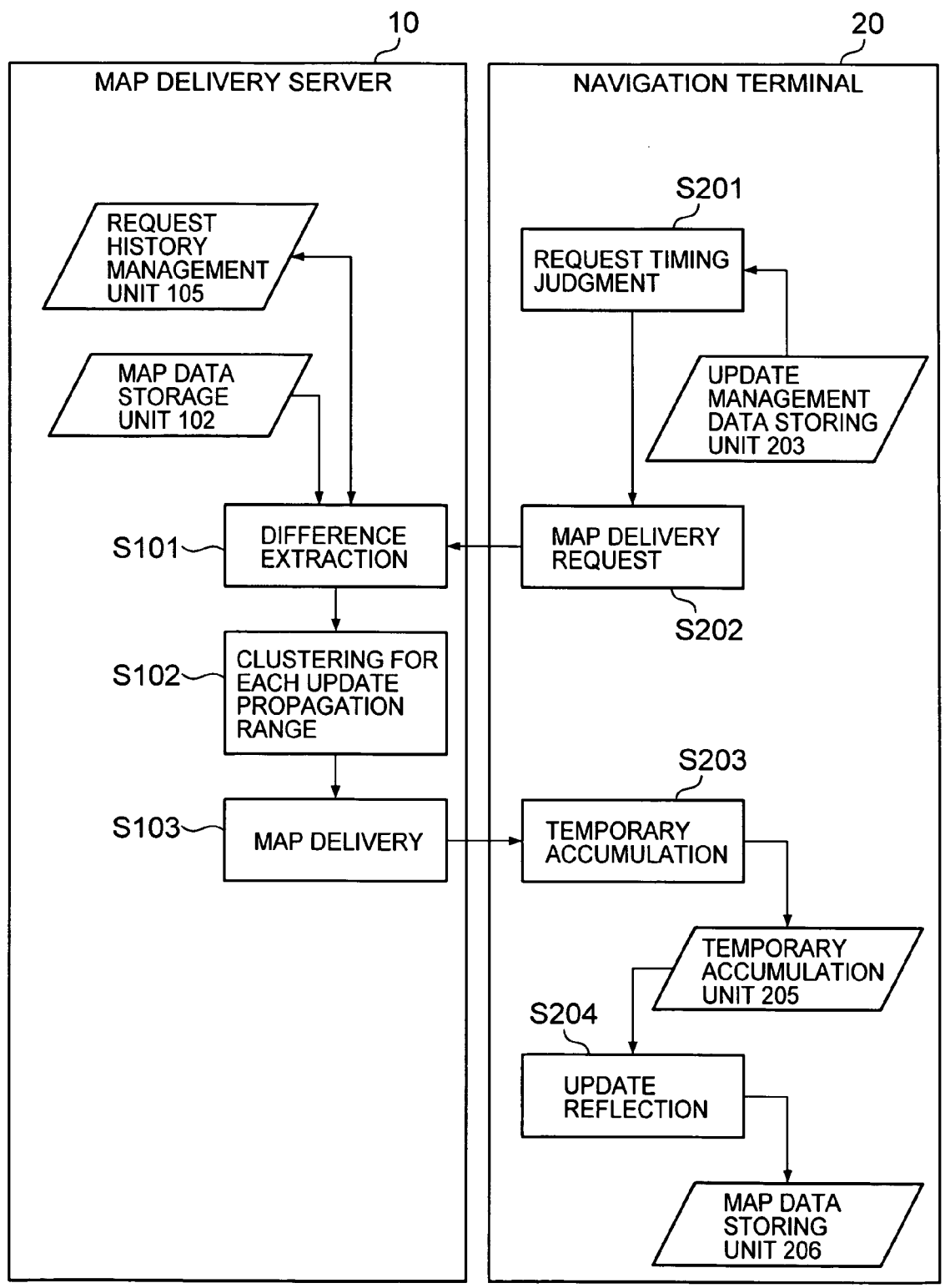
FIG. 10 is a diagram illustrating the overall operation of the map data delivery system to which the first embodiment of the present invention is applied.

FIG. 10 is a diagram illustrating the overall operation of the map data delivery system to which the first embodiment of the present invention is applied.

In the navigation terminal 20, the delivery requesting unit 202 detects update management data in the update management data storing unit 203 that has reached a time to send a map delivery request (S201), creates a map delivery request for the detected update management data, and sends the created map delivery request to the map delivery server 10 via the network interface unit 201. The delivery requesting unit 202 then updates the previous request date/time of this update management data stored in the update management data storing unit 203 with the current date/time (S202).

Prior to the start of transmission from the map delivery server 10 to the navigation terminal 20 through the map delivery processing of S103, the driver may be notified that communications for starting updating processing are to be performed, so the update processing is carried out only when the user sends a confirmation via the GUI unit 209.

Figure 22:
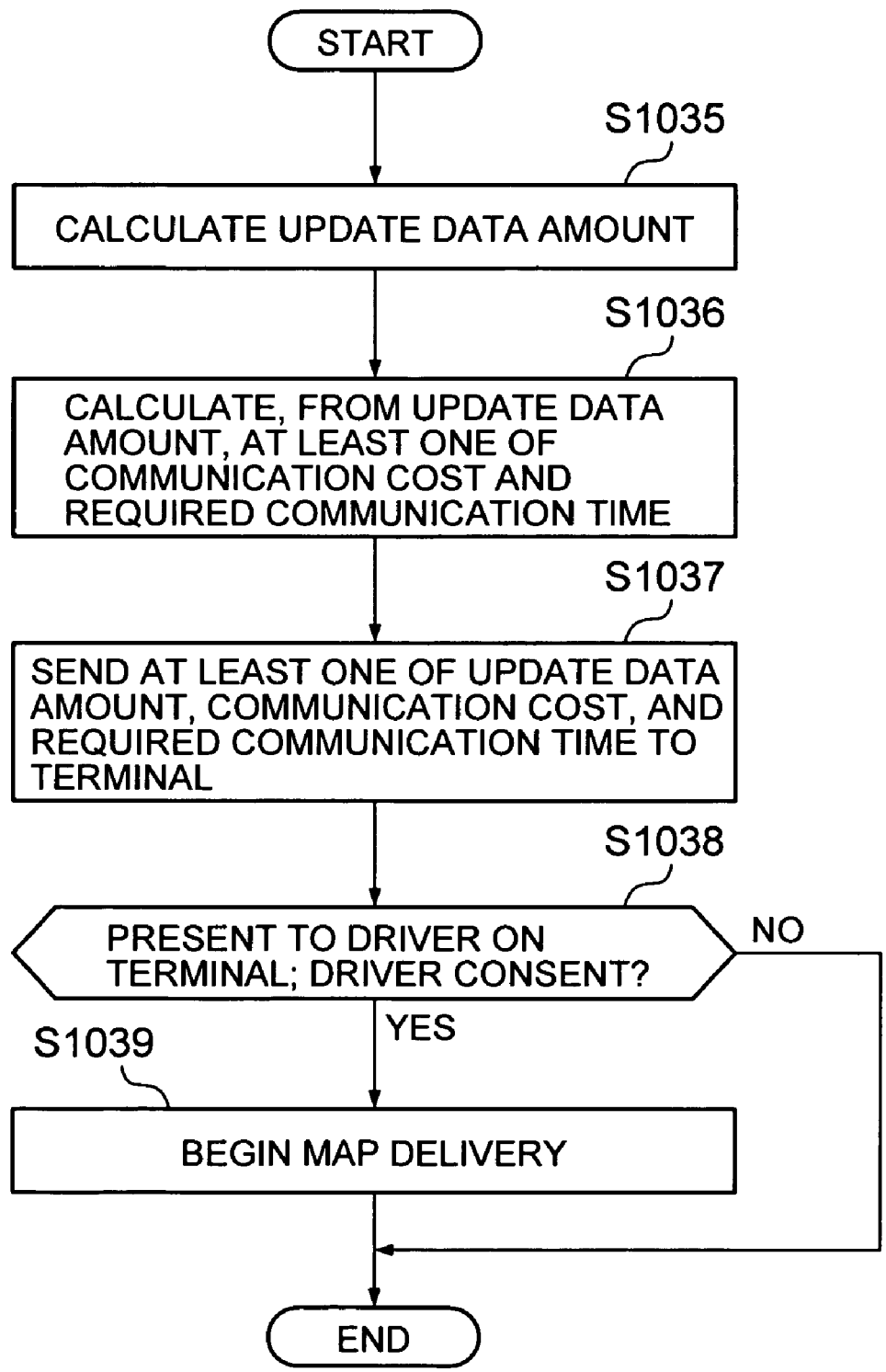
FIG. 22 is a diagram showing the flow of requesting confirmation from a driver prior to delivering a differential map.

In asking for confirmation, the map delivery server 10 may present to the user the total communication data amount and the like that are involved in the update processing. This processing is shown in FIG. 22. First, the update data amount is obtained (S1035) to calculate either the communication cost, which is calculated from the obtained update data amount and from the unit communication cost of a communication medium used by the driver, or the required data communication time, which is calculated from the communication speed of the communication medium used by the driver, or both (S1036). The calculation result is sent to the navigation terminal 20 (S1037). When a confirmation is obtained from the user via the GUI unit 209 (S1038), the update processing is executed. Adding such confirmation processing enables the driver to know to what extent the wireless communication means, such as a cellular phone, will be occupied, and thus accomplishes an update that suits the needs of the user.

In the map delivery server 10, the map component retrieving unit 103 receives a map delivery request from the navigation terminal 20 via the network interface unit 101 and, in response, searches the map data storing unit 102 for link data that satisfies conditions set by the map delivery request with the update propagation range, the modification date/time, the creation date/time, and the deletion date/time as keys. Link data that has been sent to the navigation terminal 20 after the previous request date/time contained in the received map delivery request is excluded from the search by consulting the previous map delivery request reception date/time which is managed by the request history management unit 105 in association with each area. The request history management unit 105 updates, with the current date/time, a reception date that has been managed in association with an area for which a map is requested to be delivered by the received map delivery request (S101). Next, the clustering processing unit 104 groups, by update propagation range, map delivery parts of the link data searched for by the map component retrieving unit 103 (clustering) (S102). The grouped map delivery parts (called delivery data) of the link data are sent group by group to the navigation terminal 20 (S103).

In the navigation terminal 20, the delivery requesting unit 202 receives the delivery data from the map delivery server 10 via the network interface unit 201, and hands the delivery data over to the incremental update processing unit 204. The incremental update processing unit 204 stores the delivery data in the temporary accumulation unit 205 (S203). When the navigation terminal 20 enters a given state, such as an address state in which the navigation processing unit 207 is not performing navigation processing, the incremental update processing unit 204 makes the map data storing unit 206 reflect, one set of delivery data at a time (group by group), the content of delivery data accumulated in the temporary accumulation unit 205 (S204).

Figure 11:
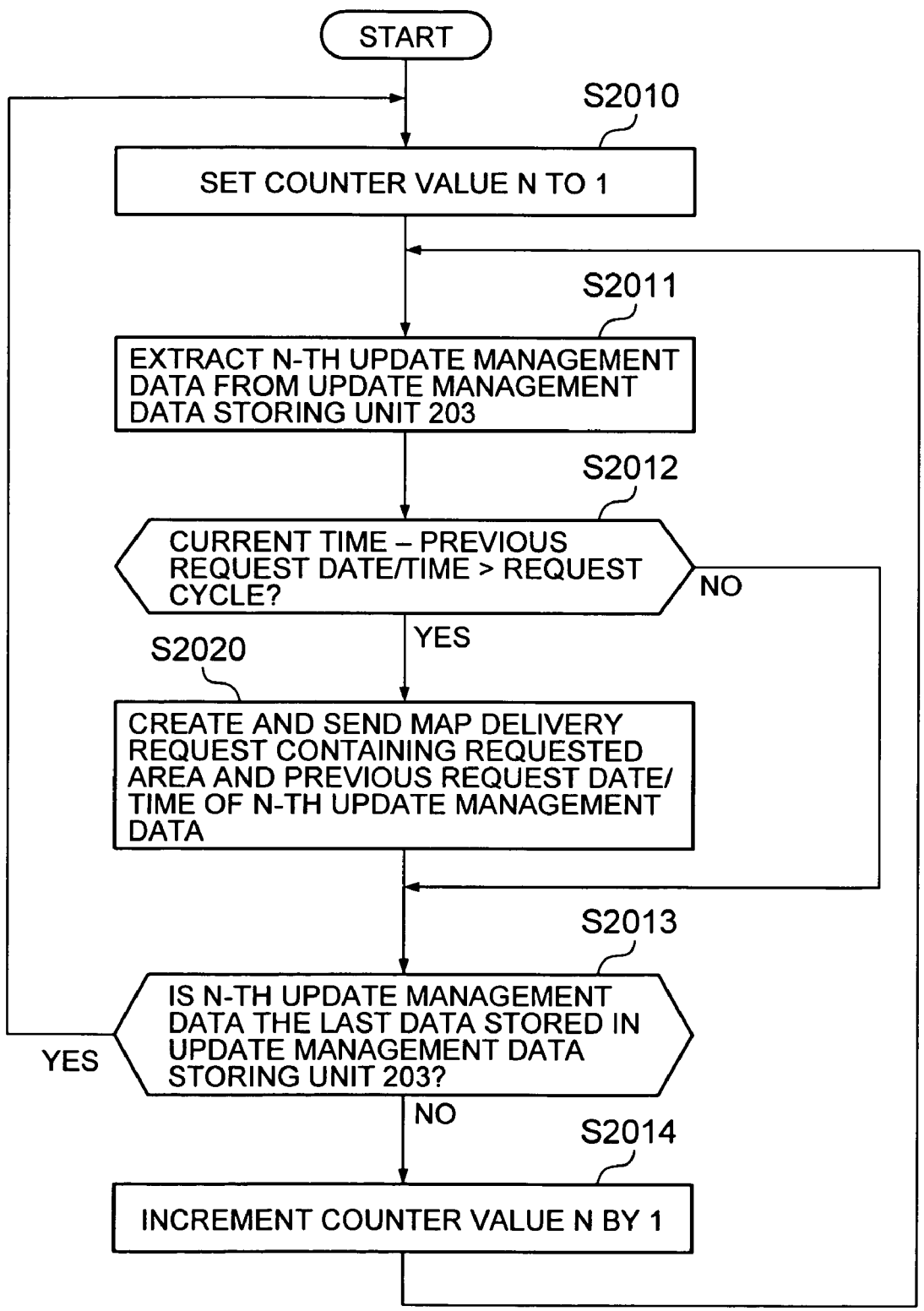
FIG. 11 is a diagram illustrating the operation flow of S201 (request timing judgment) and S202 (map delivery request) which are shown in FIG. 10.

FIG. 11 is a diagram illustrating the operation flow of S201 (request timing judgment) and S202 (map delivery request) which are shown in FIG. 10.

In the navigation terminal 20, the delivery requesting unit 202 sets a counter value n to 1 (S2010). The delivery requesting unit 202 then extracts the n-th update management data from the update management data storing unit 203 (S2011).

Next, the delivery requesting unit 202 calculates the time elapsed since the previous request date/time of the extracted n-th update management data till the current date/time provided by a built-in timer or the like (not shown in the drawing), and judges whether or not the elapsed time is larger than the request cycle of the extracted n-th update management data (S2012). When the elapsed time is not larger than the request cycle, the delivery requesting unit 202 judges that the n-th update management data has not reached a time to send a map delivery request, and proceeds to S2013. When the elapsed time is larger than the request cycle, on the other hand, the delivery requesting unit 202 judges that the n-th update management data has reached a time to send a map delivery request, and creates a map delivery request that contains the previous request date/time 2021 and requested area 2022 of the n-th update management data (see FIG. 6). The delivery requesting unit 202 sends the created map delivery request to the map delivery server 10 via the network interface unit 201 (S2020), and then proceeds to S2013.

In S2013, the delivery requesting unit 202 returns to S2010 when the n-th update management data is the previous data stored in the update management data storing unit 2013. When the n-th update management data is not the previous data, the delivery requesting unit 202 increments the counter value n by 1 (S2014) and then returns to S2011.

FIG. 12 is a diagram illustrating the operation flow of S101 (difference extraction) which is shown in FIG. 10.

In the map delivery server 10, the map component retrieving unit 103 receives a map delivery request from the navigation terminal 20 via the network interface unit 101 and, in response, extracts from the map data storing unit 102 every piece of link data whose update propagation range (field 1028) covers a link that belongs, at least partially, to a requested area contained in the received map delivery request (S1010). A link that belongs at least partially to a requested area refers to a link whose point sequence data has a point (coordinate value) that is within the requested area, or has two adjacent points that form a line intersecting the requested area.

Next, the map component retrieving unit 103 sets a counter value n to 1 (S1011). The map component retrieving unit 103 then focuses on the n-th extracted link data among the link data extracted in S1010 (S1012).

The map component retrieving unit 103 checks whether or not any of the following date/time of the n-th extracted link data is newer than the previous request date/time contained in the map delivery request (S1013): the road width modification date/time (field 1022); the class modification date/time (field 1025); the point sequence modification date/time (field 1027); the record creation date/time (field 1029); and the record deletion date/time (field 1030). In the case where none of the date/time of modification of the above items, the record creation date/time, and the record deletion date/time is newer than the previous request date/time contained in the map delivery request, it means that the n-th extracted link data has received no modifications since the previous request date/time contained in the map delivery request. Then the map component retrieving unit 103 proceeds to S1017. On the other hand, in the case where any of the date/time of modification of the above items, the record creation date/time, and the record deletion date/time is newer than the previous request date/time contained in the map delivery request, it means that the n-th extracted link data has received some modifications since the previous request date/time contained in the map delivery request. Then the map component retrieving unit 103 further checks whether or not the date/time of modification of the above items, the record creation date/ time, or the record deletion date/time that is newer than the previous request date/time is newer than every date/time managed by the request history management unit 105 in association with each area that overlaps the update propagation range of the n-th extracted link data (each area to which any link within the update propagation range belongs partially or entirely) (S1014).

When it is found in S1014 that the date/time of modification of the above items, the record creation date/time, or the record deletion date/time that is newer than the previous request date/time is not newer than every date/time managed by the request history management unit 105 in association with each area that overlaps the update propagation range, it means that the current contents of the n-th extracted link record have already been sent to the navigation terminal 20. Then the map component retrieving unit 103 proceeds to S1017. On the other hand, when it is found in S1014 that the date/time of modification of the above items, the record creation date/time, or the record deletion date/time that is newer than the previous request date/time is newer than every date/ time managed by the request history management unit 105 in association with each area that overlaps the update propagation range, it means that the current contents of the n-th extracted link record are yet to be sent to the navigation terminal 20. Then the map component retrieving unit 103 proceeds to S1015.

In S1015, the map component retrieving unit 103 determines sections of the n-th extracted link data as subjects to be delivered. The subject for delivery sections are those related to the date/time of modification of the above items, the record creation date/time, and the record deletion date/time that are newer than the previous request date/time contained in the map delivery request and every date/time managed by there quest history management unit 105 in association with each area that overlaps the update propagation range of the n-th extracted link data. The map component retrieving unit 103 then proceeds to S1016.

For instance, when the road width modification date/time (field 1023) is newer than the previous request date/time contained in the map delivery request and every date/time managed by the request history management unit 105 in association with each area that overlaps the update propagation range (field 1028), the road width (field 1022) is determined as a subject for delivery. When the class modification date/time (field 1025) is newer than the previous request date/time contained in the map delivery request and every date/time managed by the request history management unit 105 in association with each area that overlaps the update propagation range (field 1028), the road class flag (field 1024) is determined as a subject for delivery. When the point sequence modification date/time (field 1027) is newer than the previous request date/time contained in the map delivery request and every date/time managed by the request history management unit 105 in association with each area that overlaps the update propagation range (field 1028), the point sequence data (field 1026) is determined as a subject for delivery. When the record creation date/time (field 1029) is newer than the previous request date/time contained in the map delivery request and every date/time managed by there quest history management unit 105 in association with each area that overlaps the update propagation range (field 1028), the road width, the road class flag, and the point sequence data are determined as subjects for delivery. When the record deletion date/time (field 1030) is newer than the previous request date/time contained in the map delivery request and every date/time managed by the request history management unit 105 in association with each area that overlaps the update propagation range (field 1028), it is determined that there is no subject for delivery.

Instead of describing the coordinate values or the like of the entire modified link, specifics of the modification may be described so that only differential data resulting from the modification is transmitted. For example, what is modified and what class of modification such as addition and migration is made are described. In this way, the amount of data managed is reduced. This may be employed in combination with the above embodiment so that, by attaching flags, a more suitable option can be chosen depending on the data amount or the like.

In S1016, the map component retrieving unit 103 notifies the clustering processing unit 104 of the subject for delivery determined in S1015, along with the ID (field 1021) and update propagation range (field 1028) of the n-th extracted link data. In the case where there is no subject for delivery, the map component retrieving unit 103 notifies the clustering processing unit 104 of the ID and update propagation range of the n-th extracted link data alone. The map component retrieving unit 103 then proceeds to S1017.

In S1017, the map component retrieving unit 103 proceeds to S1019 when the n-th link data is the previous one of the link data extracted in S1010. When the n-th link data is not the previous one, the map component retrieving unit 103 increments the counter value n by 1 (S1018), and then returns to S1012. In S1019, the map component retrieving unit 103 notifies the request history management unit 105 of the requested area that is contained in the map delivery request. The request history management unit 105 updates, with the current date/time, a date/time that is associated with the requested area notified by the map component retrieving unit 103.

Figure 13A:
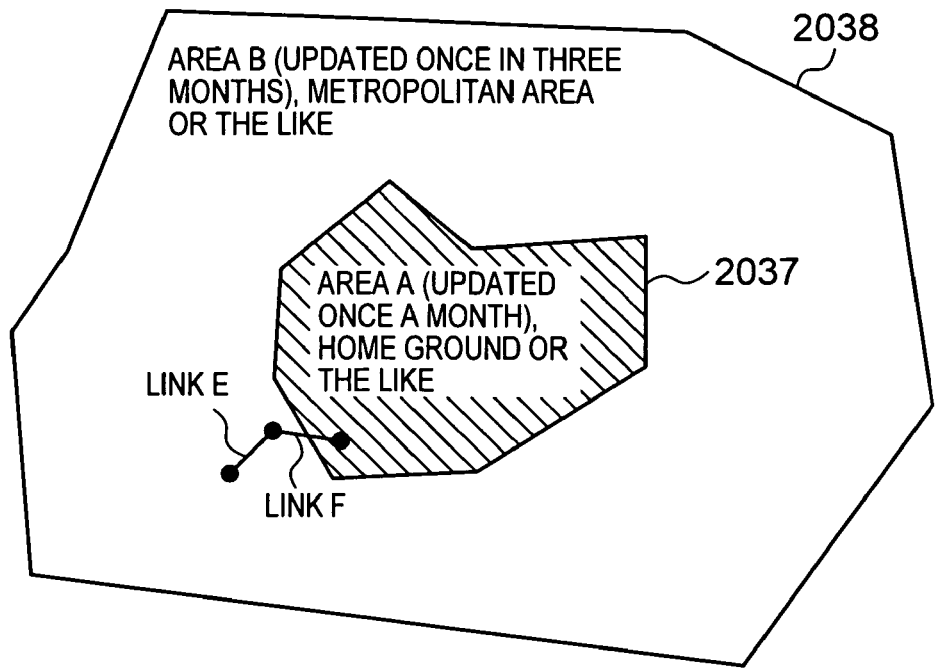
FIGS. 13(A) and 13(B) are diagrams illustrating a link that is determined as a subject for delivery through the flow shown in FIG. 12.
Figure 13B:
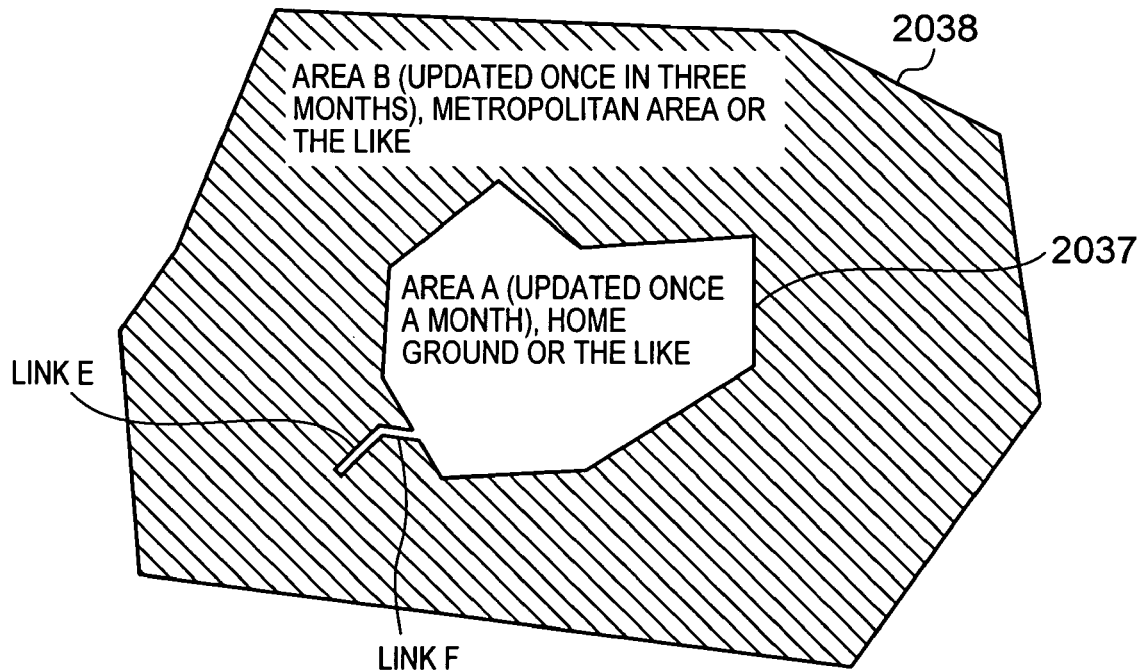

FIGS. 13(A) and 13(B) are diagrams illustrating a link that is determined as a subject for delivery through the flow shown in FIG. 12. As shown in the drawings, a newly added link E belongs to an area B, whereas a link F, which is within the update propagation range of link data of the link E, partially belongs to an area A. The area A is located inside the area B. If the area A is a requested area contained in a map delivery request that is received first since the date/time of addition of the link E, the map component retrieving unit 103 determines the link E as a subject for delivery because the link F, which is within the update propagation range of the link E, partially belongs to the area A (FIG. 13(A)). The map component retrieving unit 103 then updates, with the current date/time, a date/time that has been managed by the request history management unit 105 in association with the area A, which is the requested area of this map delivery request. If the area B is a requested area contained in a map delivery request that is received second, the link E is not a subject for delivery because, although the link E, and part of the link F, which are within the update propagation range, belong to the area B, a date/time that is managed by the request history management unit 105 in association with the area A overlapping the update propagation range is newer than the date/time of addition of the link E (FIG. 13(B)). Sending a duplicate of the same link data of the link E can thus be avoided.

Figure 14:
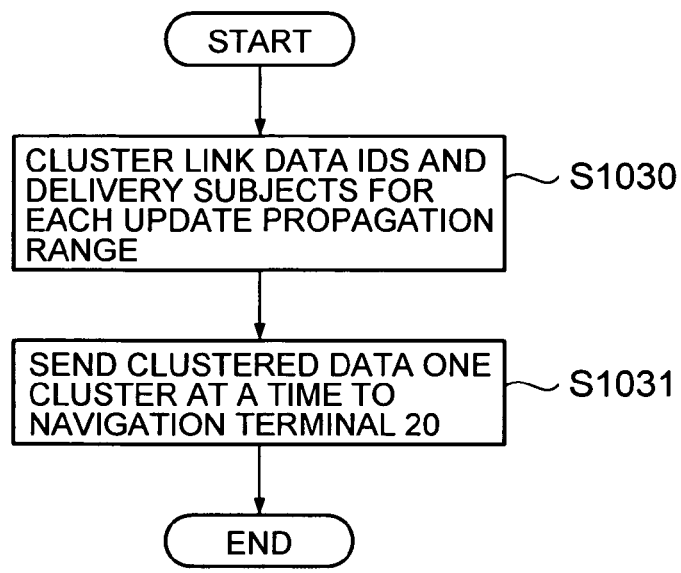
FIG. 14 is a diagram illustrating the operation flow of S102 (clustering by update propagation range) and S103 (map delivery) which are shown in FIG. 10.

FIG. 14 is a diagram illustrating the operation flow of S102 (clustering by update propagation range) and S103 (map delivery) which are shown in FIG. 10.

In the map delivery server 10, the clustering processing unit 104 receives link data IDs and subjects for delivery from the map component retrieving unit 103, and groups the received IDs and subjects for delivery together for each update propagation range that is received from the map component retrieving unit 103 in association with the ID and subject for delivery. The clustering processing unit 104 thus creates cluster data which holds link data IDs and subjects for delivery that are associated with the same update propagation range (in some cases, there are no subjects for delivery) (S1030). The clustering processing unit 104 sends the cluster data created in the manner described above to the navigation terminal 20 that has sent the map delivery request (S1031).

Figure 15:
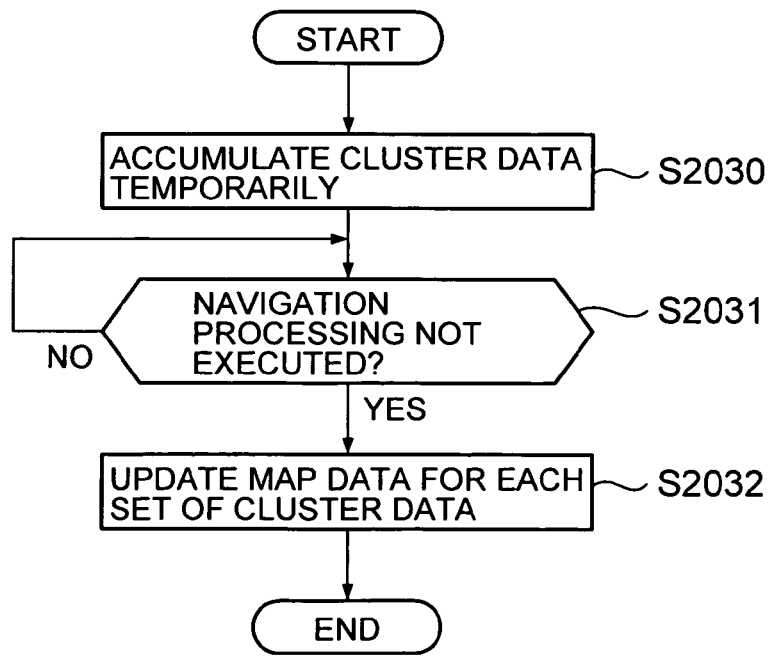
FIG. 15 is a diagram illustrating the operation flow of S203 (temporary accumulation) and S204 (update reflection) which are shown in FIG. 10.

FIG. 15 is a diagram illustrating the operation flow of S203 (temporary accumulation) and S204 (update reflection) which are shown in FIG. 10.

In the navigation terminal 20, the delivery requesting unit 202 receives cluster data in response to a map delivery request that it has sent, and hands the cluster data over to the incremental update processing unit 204. The incremental update processing unit 204 stores the received cluster data in the temporary accumulation unit 205 (S2030). The incremental update processing unit 204 then monitors the operation state of the navigation processing unit 207, and detecting that the navigation processing unit 207 is in an idle state in which navigation processing such as route search and route navigation is not performed (S2031), reads one set of cluster data out of the temporary accumulation unit 205 to make the map data storing unit 206 reflect this cluster data (S2032).

Specifically, the incremental update processing unit 204 reads, out of the read cluster data, one pair of link data ID and subject for delivery. The incremental update processing unit 204 identifies which link data record 2060 in the map data storing unit 206 has the read ID. The incremental update processing unit 204 then registers, as an update, the read subject for delivery (each subject for delivery when there is a plurality of subjects for delivery read) in the corresponding field of the identified record 2060. In the case where no subject for delivery is associated with the read ID, the identified record 2060 is deleted. In the case where no record 2060 stored in the map data storing unit 206 has the read ID, a new record 2060 that has the read ID is added to the map data storing unit 206, and the read subject for delivery is registered in the corresponding field of the newly added record 2060.

The first embodiment of the present invention has been described above.

According to this embodiment, data of a link that has not been updated since a previous request date/time contained in a map delivery request is not sent from the map delivery server 10 to the navigation terminal 20 even if the link is within a requested area designated by the map delivery request. Unnecessary communication traffic is thus prevented.

When a link is updated after the previous request date/time of the map delivery request, the map delivery server 10 sends link data of the updated link to the navigation terminal 20 even if the updated link itself does not belong to the requested area of the map delivery request, as long as a link that is within the update propagation range of the link data of the updated link belongs, at least partially, to the requested area of the map delivery request. An update part of map data can therefore be delivered without causing inconsistencies in the updated map.

In addition, a link whose link data has been sent from the map delivery server 10 to the navigation terminal 20 after the date/time of update of the link, is excluded as a subject for delivery, and sending a duplicate of the same link data can thus be prevented.

The first embodiment described above avoids redundant delivery of link data by managing the delivery request history with the use of the request history management unit 105 provided in the map delivery server 10. However, the present invention is not limited thereto. For instance, when sending a map delivery request to the map delivery server 10, the delivery requesting unit 202 of the navigation terminal 20 may consult the update management data storing unit 203 to identify areas adjacent to a requested area that is specified by the map delivery request (surrounding and internal requested areas), so the previous map delivery request date/time of each of the identified areas is sent along with the map delivery request, in place of the "previous request date" managed by the request history management unit 105. In this way, there quest history management unit 105 can be omitted from the map delivery server 10.

Second Embodiment

A second embodiment of the present invention will be described next. In this embodiment, when link data stored in the map data storing unit 102 is updated in the first embodiment, the map delivery server 20 notifies the navigation terminal 20 of the update and, in response, the navigation terminal 20 judges when to issue a map delivery request.

Figure 16:
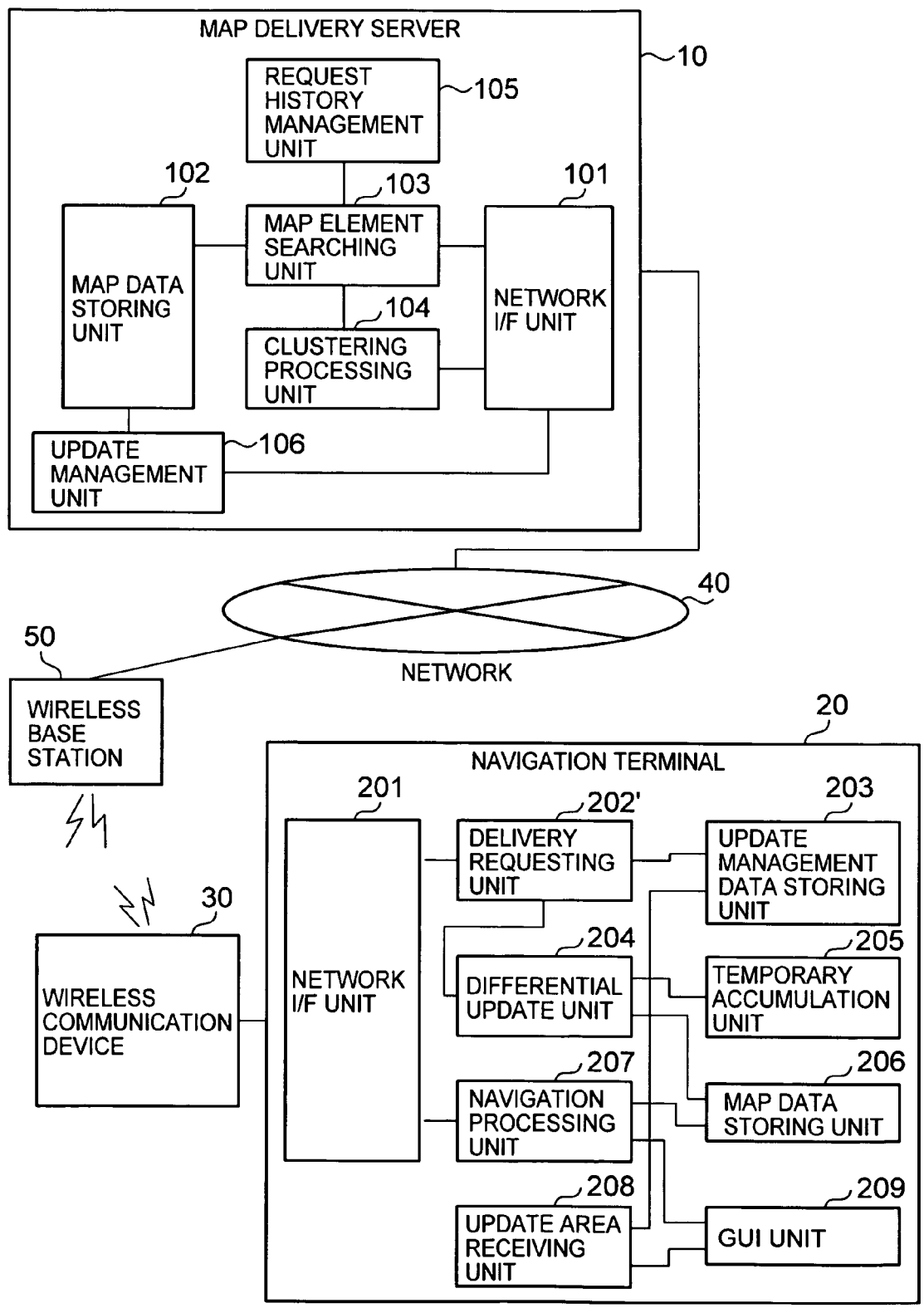
FIG. 16 is a schematic diagram of a map data delivery system to which a second embodiment of the present invention is applied.

FIG. 16 is a schematic diagram of a map data delivery system to which the second embodiment of the present invention is applied. As shown in the drawing, the map data delivery system of this embodiment differs from the map data delivery system of the first embodiment shown in FIG. 1 in that the map delivery server 20 has an update management unit 106 and that the navigation terminal 20 has a delivery requesting unit 202' instead of the delivery requesting unit 202. The rest of the configuration is the same as in the map data delivery system of the first embodiment.

Figure 17:
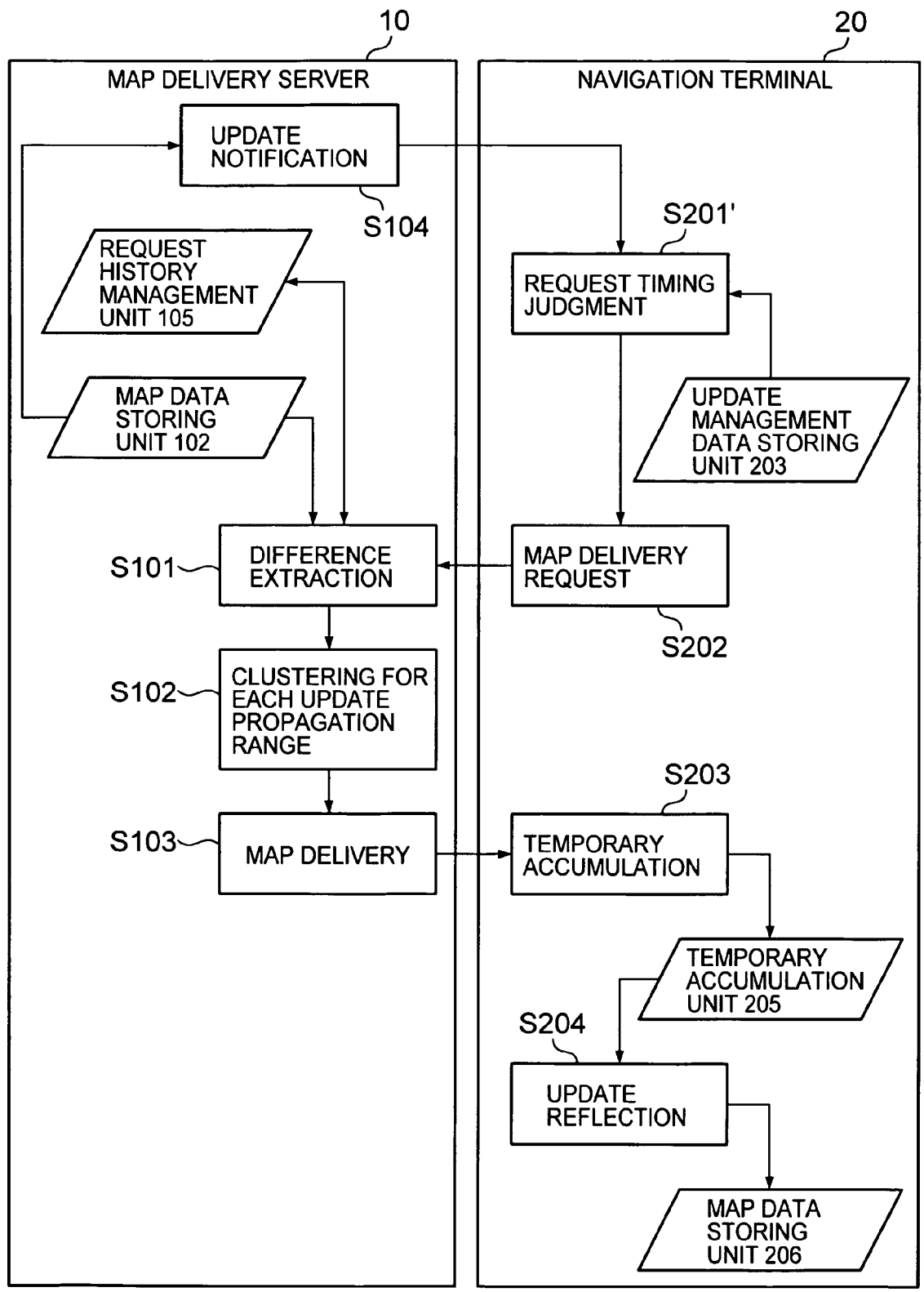
FIG. 17 is a diagram illustrating the overall operation of the map data delivery system to which the second embodiment of the present invention is applied.

FIG. 17 is a diagram illustrating the overall operation of the map data delivery system to which the second embodiment of the present invention is applied. The overall operation in this embodiment differs from the map data delivery system of the first embodiment that is shown in FIG. 10 in that S104 (update notification) is added as processing of the map delivery server 10 and that S201 (request timing judgment) in the navigation terminal 20 is replaced with S201' (request timing judgment).

In S104, the update management unit 106 of the map delivery server 10 monitors the map data storing unit 102. Detecting a change such as creation, modification or deletion of the link data record 1020, the update management unit 106 creates an update notification that contains point sequence data registered in the field 1026 of the changed record 1020, and sends the update notification to the navigation terminal 20 via the network interface unit 101.

In S201', the delivery requesting unit 202' of the navigation terminal 20 receives the update notification from the map delivery server 10 via the network interface unit 201, and identifies which update management data record 2030 in the update management data storing unit 203 has the field 2034 that registers an area in which the point sequence data contained in the update notification is located. The delivery requesting unit 202' calculates the time elapsed since the previous request date/time of the identified update management data till the current date/time provided by a built-in timer or the like (not shown in the drawing), and judges whether or not the elapsed time is larger than the request cycle of this update management data. When the elapsed time is not larger than the request cycle, the delivery requesting unit 202' judges that this update management data has not reached a time for sending a map delivery request, and ends the processing. When the elapsed time is larger than the request cycle, on the other hand, the delivery requesting unit 202' judges that this update management data has reached a time for sending a map delivery request, and proceeds to S202 (map delivery).

The second embodiment of the present invention has been described above.

According to this embodiment, only when there is a change in the map data storing unit 102 of the map delivery server 10 and a request cycle has elapsed since the date/time when a map delivery request was previously made about an area where the change has occurred, the navigation terminal 20 sends a map delivery request about the area of the change to the map delivery server 10. Therefore, unnecessary communication traffic is prevented even more effectively than in the first embodiment.

The present invention is not limited to the above embodiments, and various modifications can be made without departing from the spirit of the present invention.

For instance, in the above embodiments, the link data record 1020 stored in the map data storing unit 102 of the map delivery server 10 has fields for registering modification date/time of data with which attributes of a link such as road width and road class are identified, and modification date/time of point sequence data with which the link itself is identified. The data used to identify link attributes and the point sequence data used to identify the link itself can each independently be determined as a subject for delivery. However, the present invention is not limited thereto. For instance, as shown in FIG. 18, the record 1020 may have one field 1031 for registering modification date/time for the data used to identify link attributes and the point sequence data used to identify the link itself, so the data used to identify link attributes and the point sequence data used to identify the link itself are paired with each other and determined as a subject for delivery. In this way, the amount of data managed is reduced.

In the above embodiments, the map data storing unit 206 of the navigation terminal 20 registers the record 2060 for each piece of link data. However, the present invention is not limited thereto. For instance, as shown in FIG. 19, the map data storing unit 206 may register for each given area (e.g., cell of a mesh) a record 2068 which holds link data belonging to the area. In FIG. 19, a field 2065 is a field for registering the ID of the record 2068, a field 2066 is a field for registering coordinate information with which the area is identified, a field 2067 is a field for registering link data (link data record 2060 shown in FIG. 7) of each link that belongs to the area identified by the coordinate information in the field 2066. Giving the map data storing unit 206 a data configuration like this makes it possible to read link data out of the map data storing unit 206 area by area, that is, to read every piece of link data that belongs to the same area at once. Data read processing can therefore be sped up when quick response is required as in map display. Moreover, update processing such as addition or deletion of link data is accomplished by adding or deleting an element to/from the field 2067. The update management data storing unit 203 in this case stores the update management data record 2030 that is prepared for each given area.

Such map data is managed on a single level in the above embodiments, but the present invention is not limited to this management method. The map data storing unit 102 of the map delivery server 10 and the map data storing unit 206 of the navigation terminal 20 may sort and store map data on a plurality of levels. To store map data on the plurality of levels, tables having the same configuration as when map data is managed on a single level are prepared in a number corresponding to the number of levels. In the case where map data is sorted into different levels by road class, for example, all road classes are stored on Level 1, prefectural roads, national roads, and highways minus narrow streets and local roads are stored on Level 2, and only major roads such as national roads and highways are stored on Level 3. In the case where map data is sorted into different levels by accuracy of road coordinate values, high-precision data is stored on Level 1, data of intermediate precision is stored on Level 2, and low-precision data is stored on Level 3. It is also possible to sort map data into different levels by road class as described above and also by accuracy. This enables the navigation terminal 20 to choose a level sorted by accuracy and class in displaying a map enlarged or reduced, and the load of map display processing is lessened.

In map update processing, in the case where the map delivery server 10 manages data on the plurality of levels sorted by road class as described above, difference extraction may be performed only on some of the levels, so, for example, only major roads and above are selectively delivered. (Alternatively, in the update propagation range determining processing shown in FIG. 3, the update propagation range may be determined by limiting the road class, for example, "major road and above".) The difference extraction with the road class limited is effective in updating a map of a distant place, past the area B and area C shown in FIG. 5, and in particular, along a route in a long-distance trip or the like. That is, it is assumed that, for example, during a long-distance drive or the like in which a vehicle travels in a distant area (areas B and C of FIG. 5) outside of the user's home ground (area A of FIG. 5), where the vehicle will travel on fewer narrow streets, the map data is sufficiently useful if data of major roads and above is updated. Selectively delivering major roads alone is also beneficial since the amount of data delivered is reduced.

The level-limited incremental update processing is described below. First, a table is prepared for each level by sorting the map data that is shown in FIG. 2 by accuracy of coordinate values or by road class, and is stored in the map data storing unit 102 of the map delivery server 10. Map data sorted into as many levels as the number of levels in the map data storing unit 102 is stored in the map data storing unit 206 of the navigation terminal 20. In the case where map data is managed on a link basis as described in the above embodiments, the navigation terminal 20 stores map data tables that have the configuration shown in FIG. 7, equal in number to the number of levels. On the other hand, in the case where link data is managed collectively on a mesh basis, as shown in FIG. 20, map data is stored in tables sorted by mesh and by level, and in storing data, map data tables that have the configuration shown in FIG. 19 are prepared, equal in number to the number of levels.

Figure 23:
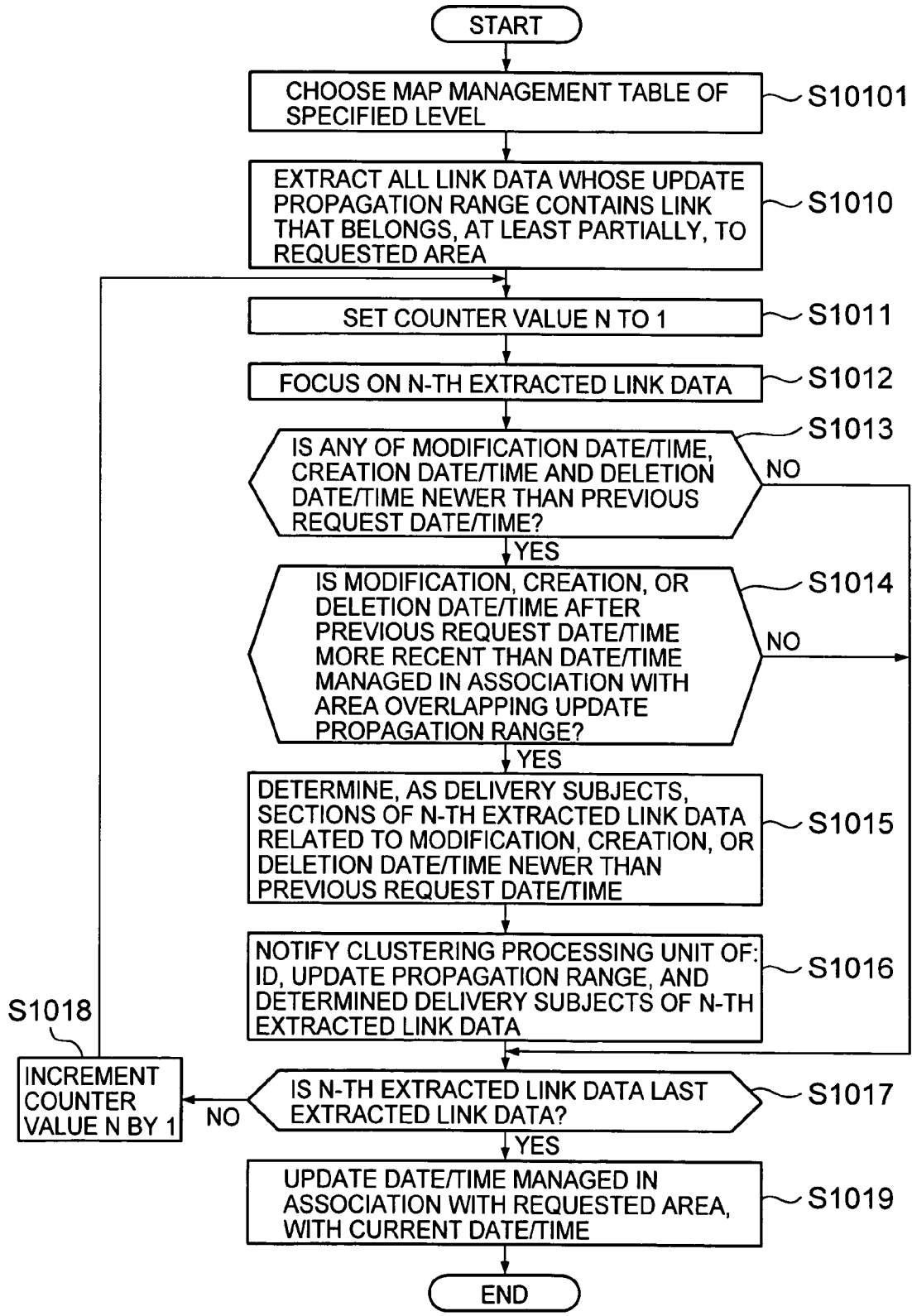
FIG. 23 is a diagram showing an extended flow of the difference extraction processing of FIG. 12 that enables specifying a level.

FIG. 23 shows the flow of the level-limited incremental update processing. This flow is the flow of FIG. 12 to which level selection processing (S10101) is added. The area information stored in the update management data storing unit 203 of FIG. 4 and the map delivery request of FIG. 6 are expanded such that level data on which extraction is to be performed can be described. In this way, information specifying a level is sent to the map delivery server along with the map delivery request issued in S202 of the update processing which is shown in FIG. 10. Subsequently, the level is consulted in the level selection processing, and difference extraction can thus be performed on a specified area and only on a specified level by following the flow of FIG. 23.

Figure 20:
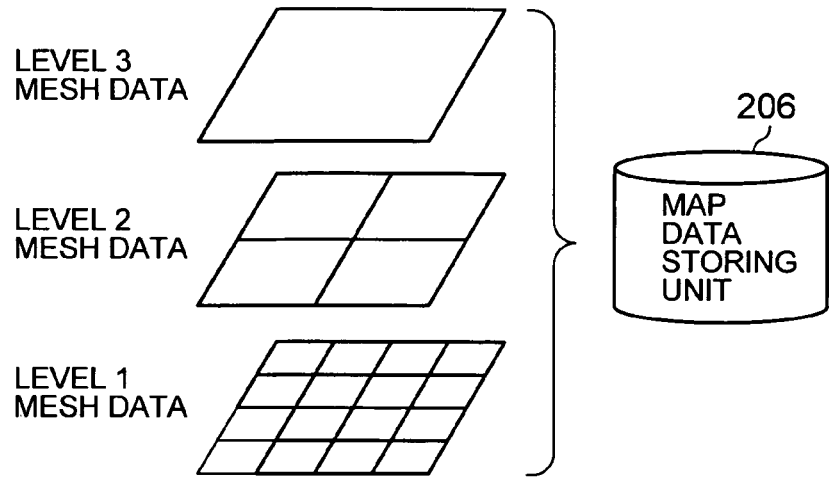
FIG. 20 is a diagram illustrating management of data in the map data storing unit (206).

The navigation terminal 20 may manage link data in the map data storing unit 206 on a mesh basis at the plurality of levels as shown in FIG. 20, while the map delivery server 10 may register, on each of the plurality of levels described above, for each mesh cell as shown in FIG. 21, for example, a record 1070 which holds link data belonging to the mesh cell in question.

Figure 21:
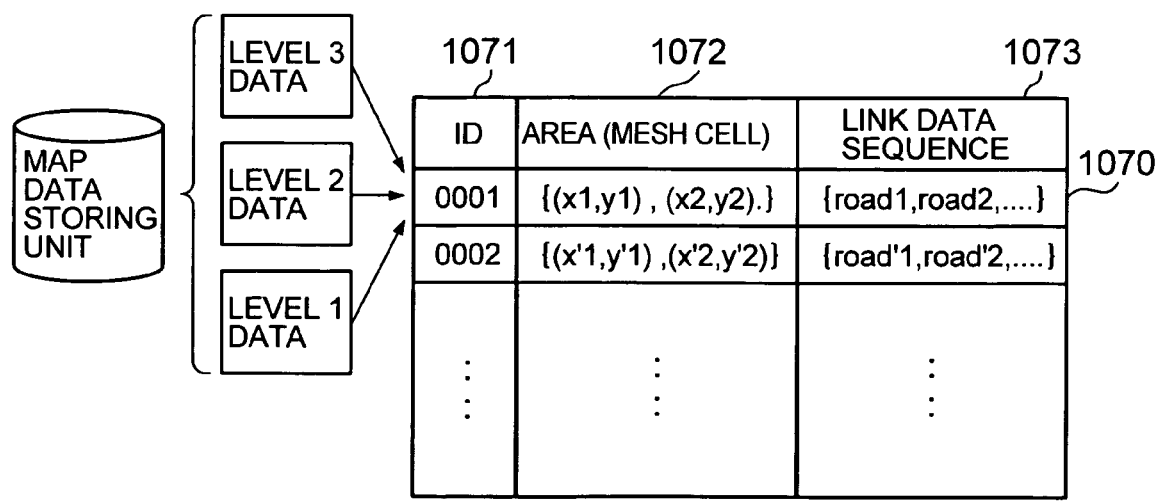
FIG. 21 is a diagram illustrating management of data in the map data storing unit (102).

In FIG. 21, a field 1071 is a field for registering the ID of the record 1070, a field 1072 is a field for registering a mesh cell ID or coordinate information with which a mesh cell is identified, and a field 1073 is a field for registering link data (link data record 1020 shown in FIG. 2) of each link belonging to the mesh cell. In this case, the update management data record 2030 shown in FIG. 4 is prepared for each mesh cell on each level in the navigation terminal 20, and the delivery requesting unit 202 creates a map delivery request for each mesh cell and sends the created map delivery request to the map delivery server 10. The map component retrieving unit 103 in the map delivery server 10 identifies a level that has the mesh cell contained in the map delivery request, and executes difference extraction (S101) for each item of link data (each record 1020) held in the record 1070 that corresponds to the identified level.

The accuracy of a link stored on an upper level differs from the accuracy of the same link stored on a lower level. In differential delivery, the link stored on the upper level and the link stored on the lower level may be delivered together to the navigation terminal 20, so the map data storing unit 206 of the navigation terminal 20 is updated without inconsistencies. For that purpose, the map data shown in FIG. 2 is prepared for each different accuracy level and stored in the map data storing unit 102 of the map delivery server 10. The map data shown in FIG. 7 is accordingly prepared for each different accuracy level in the navigation terminal 20. The map component retrieving unit 103 of the map delivery server 10 then performs difference extraction in which point sequence data in the update propagation range is used as a search criterion and link data that meets the criterion is extracted from the upper and lower levels.

Figure 24:
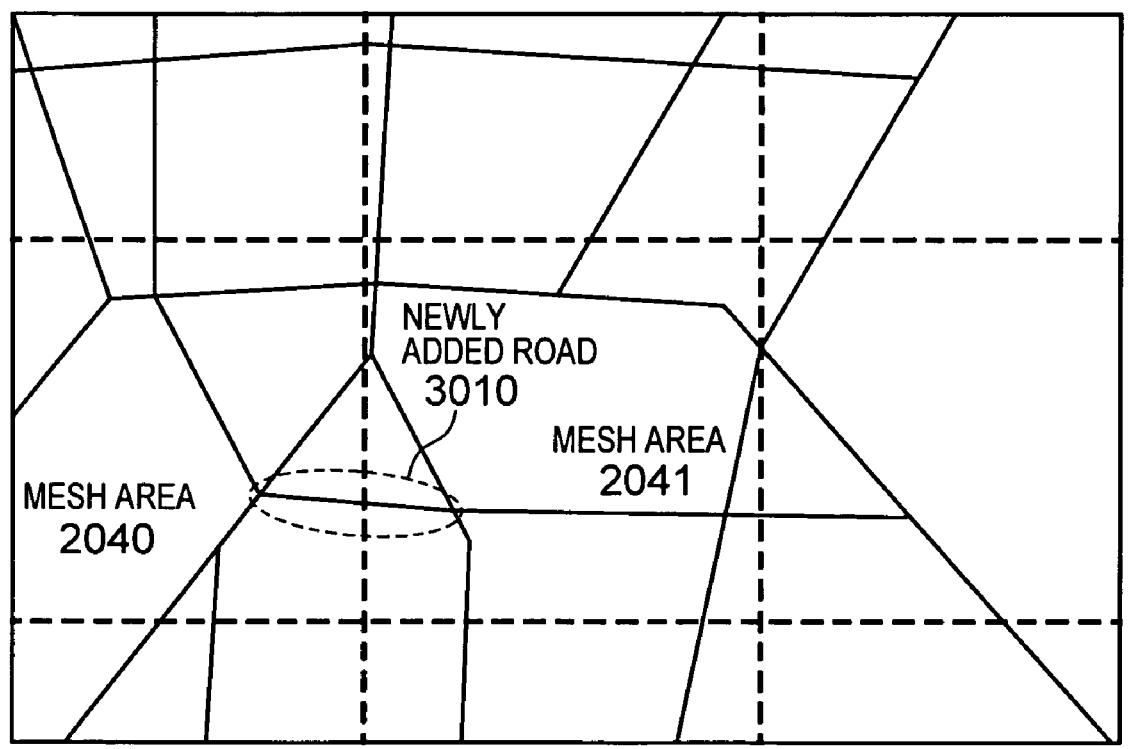
FIG. 24 is a diagram showing a state for illustrating mesh-based update processing.

A supplementary description is given on update processing when data in the map data storing unit 206 of the navigation terminal 20 is managed on a mesh basis. It is assumed that mesh-based area management is employed in which a map is divided into lattice-like mesh cells (2040, 2041, and 2042) as shown in FIG. 24, and that the mesh area 2041 is requested to be updated. If a new road 3010 which stretches across the mesh areas 2041 and 2040 is registered in the map data storing unit 10 of FIG. 1 before the request is made, the adjacent mesh area 2040 intersected by the new data is updated along with the mesh area 2041. By thus performing incremental update processing on an adjacent mesh area in addition to a requested mesh area, more information managed by the map data storing unit of the navigation terminal can be brought up to date in one communication session.

Figure 25:
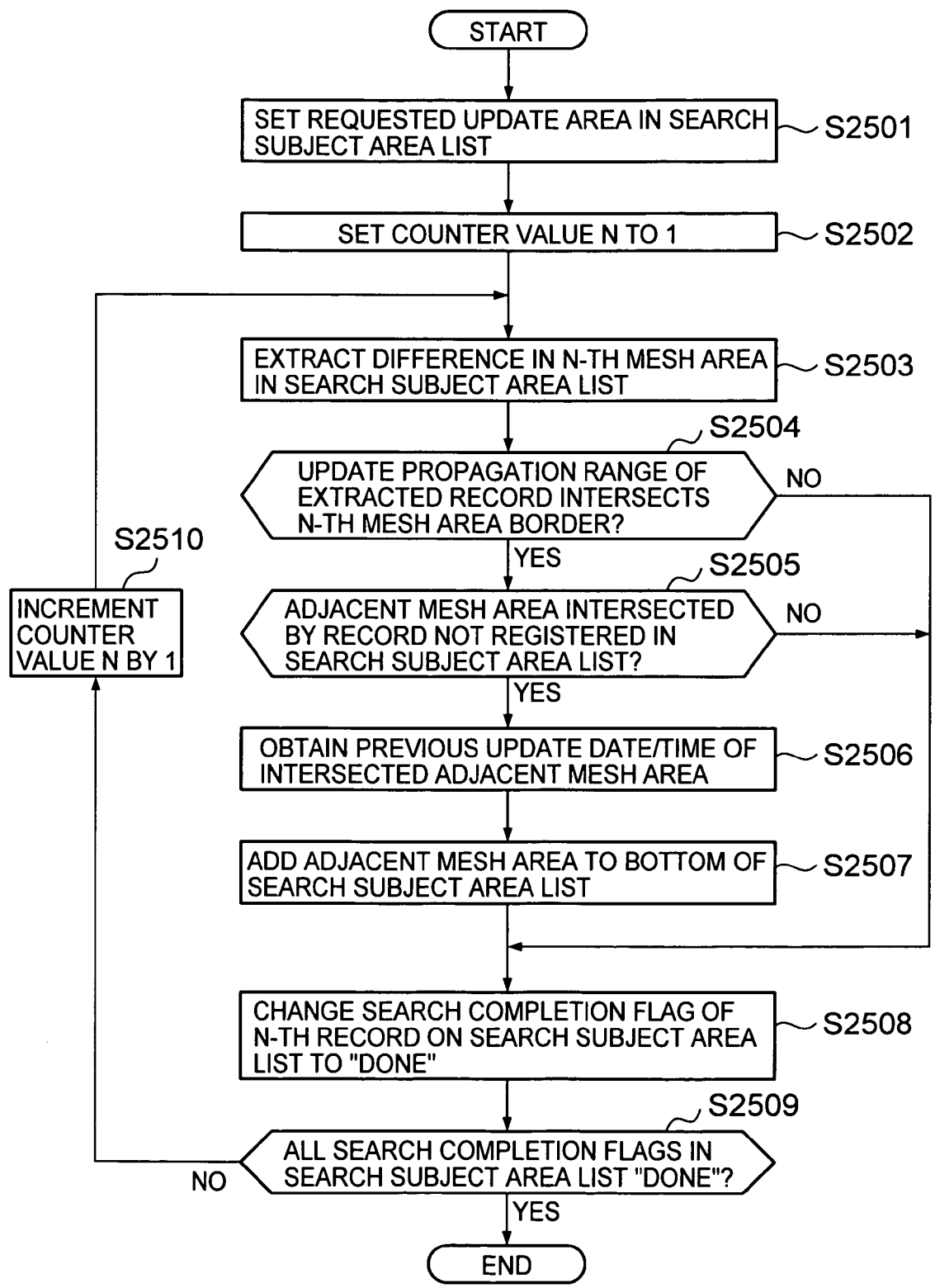
FIG. 25 is a diagram showing an extended flow of the difference extraction processing of FIG. 12 that expands a difference extraction range to include an adjacent mesh area.

This processing of including an adjacent mesh in the update propagation range is described with reference to FIGS. 25 and 26. FIG. 25 can be regarded as an expansion of the difference extraction processing S101 in FIG. 10. First, a mesh-based requested area 2022 that is described in the map delivery request 2020 received in S202 of FIG. 10 is registered in a search subject area list of FIG. 26 (S2501). In the search subject area list, a number (2601), a search completion flag (2602), an area (2603), and a previous update date/time (2604) are registered. Registered in the number field is the registration order, and the default of the search completion flag is "unfinished". Mesh areas on the search subject list are picked up one by one, starting from the first row of the list (S2502), and difference extraction is performed on records of the picked up mesh area in the map data storing unit 102 (S2503). For each extracted record, whether a mesh area border within the range of this search is intersected or not is judged (S2504) and after confirming that the intersected adjacent mesh area has not been registered in the search subject mesh area list (S2505), the previous update date/time of this adjacent mesh area is obtained from the navigation terminal 20 (S2506). The adjacent mesh area is then registered in the bottom row of the list (S2507). After every record is checked, the search completion flag (2602) of the first row of the list is changed to "finished" (S2508). This series of processing is repeated until the search is finished in every mesh area on the search subject list (S2509). Through this processing, every piece of differential information about roads in a mesh area adjacent to one that has originally been requested to be updated is delivered as long as they are within the reach of update propagation.

In the above-described update propagation to an adjacent mesh area, map update processing in the vehicle-mounted terminal takes a long time if the terminal has not updated map data for a while or if a large-scale addition or modification of roads has been made in the map center. This problem can be dealt with by setting an upper limit to the update propagation range in the form of, for example, the mesh area count or the length and width of the update propagation range. The limit mesh area count or the limit length and width may be set in the vehicle-mounted terminal as default values, or may be set by the user. The processing of FIG. 25 for extending the difference extraction range to adjacent mesh areas is changed such that a step of judging whether or not a mesh area to be processed is below the update propagation upper limit is added after S2505, and the processing proceeds to S2506 only when the mesh area is below the update propagation upper limit.

Figure 27:
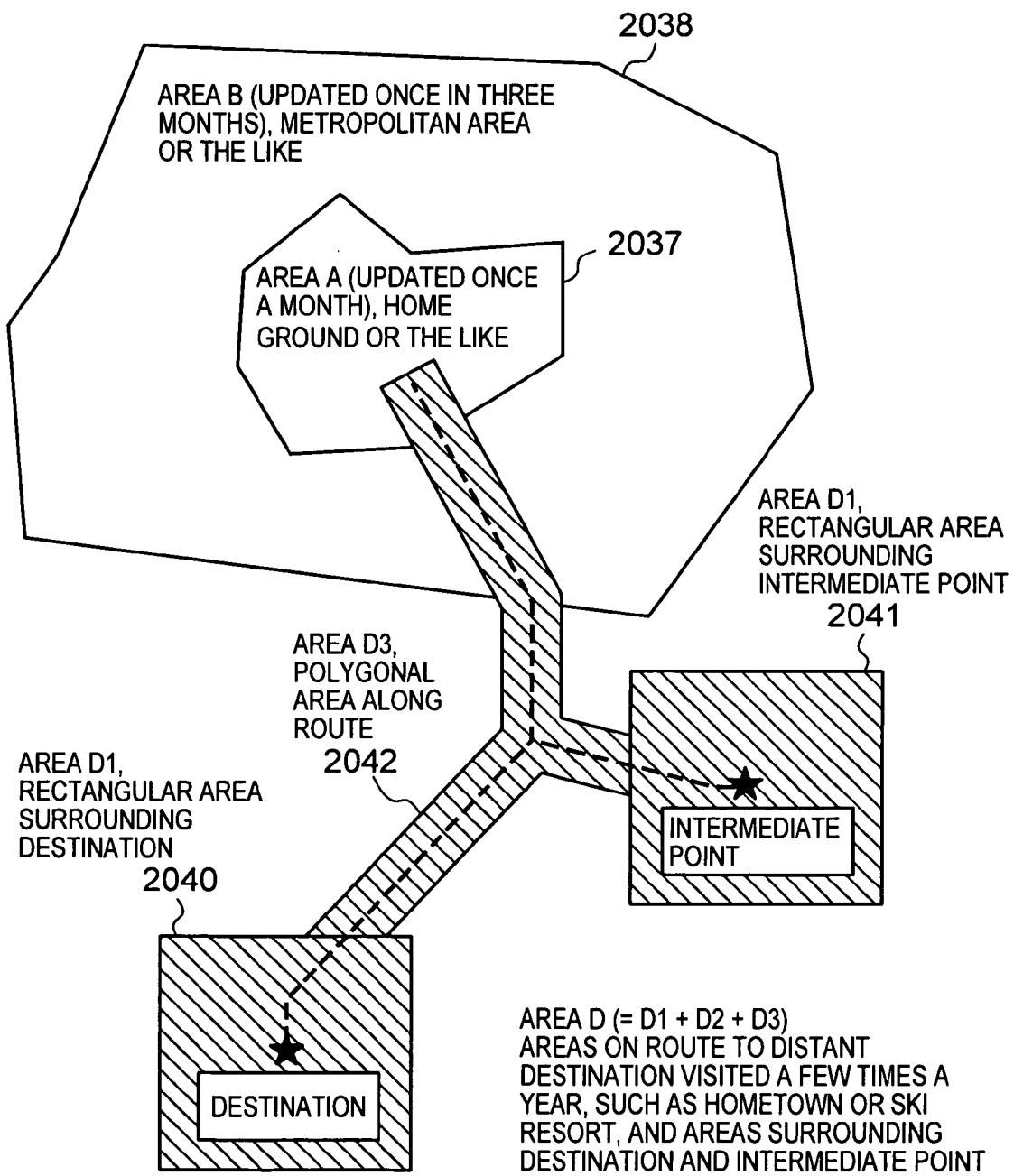
FIG. 27 is a diagram illustrating an update area that leads to a distant destination.

The areas shown in FIG. 5 and described by update management data may be set as a route area leading to a distant destination, like an area D (2040, 2041, and 2042) shown in FIG. 27. The distant destination is the user's hometown, a ski resort, or the like where the user will visit infrequently but regularly, and periodically updated data can be used. The area D is managed as the sum of an area in the vicinity of the route to the destination including intermediate stops, and rectangular or other areas surrounding the intermediate stops and the destination. This is practical since, on the route, minimum information necessary for the travel such as information on roads constituting the route and roads intersecting the route is updated as well as information on the surroundings of intermediate stops and the destination around which the user might cruise. In this case, the requirement is satisfied by expressing the requested area (2034) that is registered in the update management data storing unit of FIG. 4 as the sum of a polygon that represents areas along the route, a rectangle around an intermediate stop, and a rectangle around the destination. A history of destinations set in the past may be presented to the driver, so the driver can choose which destination to register in the update management data storing unit. Alternatively, a question asking whether to register a destination in the update management data storing unit may be displayed on the GUI unit of the navigation terminal when a new destination is set or upon arrival at a set destination, so the destination may be registered in accordance with an operation made by the driver.

FIG. 28 shows processing of creating the polygon that represents areas along the route and constitutes the above update area. Route information obtained as a result of route search which is executed by the navigation processing unit (207) of FIG. 1 is entered first. The update area receiving unit (208) uses the route information to obtain a polygonal line composed of a center line to which roads are connected in order, and each segment of the polygonal line is fattened to form a rectangle (S2801). Arcs are then drawn to interpolate bends of the figure (S2802) and, lastly, after intersecting points between the arcs and bends are obtained in order along the circumference of the figure, the arc portions are approximated to N-polygons, thus obtaining a desired polygonal area (S2803). The polygon obtained through this processing is registered in the update management data storing unit 203 through the update area receiving unit 208. As has been described, to update a route to a destination and areas along the route immediately after the destination is set, the update area is registered in the update management data storing unit 203 and then the update processing of FIG. 10 is performed to make map data in the navigation terminal reflect the update.

When there is an intermediate stop, a desired polygonal area can be obtained similarly by adding a center line that leads to the intermediate stop and performing the above-described processing. As areas surrounding the intermediate stop and the destination, rectangles of an appropriate size are drawn around the intermediate stop and around the destination, and an area obtained by joining the surrounding areas with the polygonal area drawn through the above-described processing is registered in the update management data storing unit. The difference extraction processing S1010 executed in the map delivery server 10 when the update area is polygonal as described above is similar to the difference extraction processing in the above embodiments, and link data that meets a criterion is extracted by judging whether or not link data is contained within the polygon representing the update area and whether or not link data intersects the polygon.

The level-limited difference extraction processing shown in FIG. 23 may also be employed. In this case, are as surrounding the destination and intermediate stops are updated on all levels including narrow streets whose information may be needed when cruising the areas, whereas vicinity areas along the route are updated only on some levels covering major roads whose information is necessary for traveling on the route. Thus, necessary information is updated while reducing the amount of update data. To perform this difference extraction processing that specifies a level for each area, the update management data storing unit employed has to be as shown in FIG. 29 and expanded such that a difference extraction level is described for each of D1, D2, and D3, which constitute the update area D shown in FIG. 27, and the level-limited difference extraction processing of FIG. 23 is executed. In setting a level for each area, extraction on all levels is appropriate for the destination and intermediate stops whereas extraction on Level 2 and higher is appropriate for areas along the route. Accordingly, "all levels" and "Level 2 and up" may be given as default values when the update area is registered in the update management data storing unit.

The above descriptions of the embodiments take as an example a case in which link data of a link constituting a road is delivered as a subject for delivery. However, the present invention is not limited thereto. For example, link data of a link constituting a railroad, or a map component other than link data can be a subject for delivery.

In the above embodiments, the navigation terminal 20 may be modified such that the navigation processing unit 207 is omitted and the map data storing unit 206 is detachable. The detachable map data storing unit 206 is updated by connecting the modified terminal to the network 40. The map data storing unit 206 is then detached from the terminal and attached to a separate navigation system.

In the above embodiments, the delivery requesting unit 202 and the update management data storing unit 203 may be provided in the map delivery server 10, so map delivery requests are managed by the map delivery server 10. The overall operation in this case differs from the map data delivery system of the embodiment shown in FIG. 17 in that the request timing judgment processing of S201' is moved, along with the update data storing unit 203, from the navigation terminal 20 to the map delivery server 10. This eliminates the need to notify the navigation terminal of an update, thereby lessening the load, and presents an advantage in that the server can keep track of which area has been updated up to which point for each navigation terminal. This can be utilized in operations providing a map update service such as prompting a driver who has neglected to update for a longtime, and optimizing the load reduction of the map delivery server through statistical processing of the frequency of updates made by the terminal.

The invention claimed is:

1. A map data delivering device for delivering map data to a communication terminal, comprising:
 a map data storage method which stores, for each map component, map data composed of map component data of the map component, and update propagation range data containing the map component data of the map component and map component data of other map components that are affected by a change in the map component;
 a map delivery request receiving means which receives from the communication terminal a map delivery request containing at least area information indicating an area, a map of which is requested to be delivered;
 a map component retrieving means which searches the map data storage method for the map component data whose update propagation range data is contained, at least partially, in an area indicated by the area information contained in the map delivery request; and
 a map component delivering means which sends the map component data searched for by the map component retrieving means to the communication terminal, wherein:
 the map data further contains, for each map component, an update date and time of map component data of the map component,
 the map delivery request further contains date and time information indicating a most recent map delivery request date and time for an area, a map of which is requested to be delivered,
 the map component retrieving means searches the map data storage method for map component data associated with update propagation range data containing map component data that belongs, at least partially, to an area indicated by the area information contained in the map delivery request, and associated with update date data indicating a date and time that is newer than the date and time information contained in the map delivery request, and
 the map component retrieving means excludes, as a subject of search, map component data that has been sent to the communication terminal after a date and time indicated by the associated update date and time data.

2. A map data delivering device according to claim 1, wherein:
 the map component data has point sequence data and at least one type of attribute data, the point sequence data indicating coordinates of a point or a sequence of points by which the map component is identified, and the attribute data indicating an attribute of the map component;
 the update date and time data is provided for each of the point sequence data and the attribute data; and
 the map component delivering means sends to the communication terminal, from among the map component data searched for by the map component retrieving means, at least one of the point sequence data and the attribute data that are associated with update date and time data indicating a newer date and time than the date and time information contained in the map delivery request.

3. A map data delivering device according to claim 1, wherein the map component delivering means sends, to the communication terminal, only differential data resulting from modification of the map component data searched for by the map component retrieving means.

4. A map data delivering device for delivering map data to a communication terminal, comprising:
 a map data storage method which stores, for each map component, map data composed of map component data of the map component, and update propagation range data containing the map component data of the map component and map component data of other map components that are affected by a change in the map component;
 a map delivery request receiving means which receives from the communication terminal a map delivery request containing at least area information indicating an area, a map of which is requested to be delivered;
 a map component retrieving means which searches the map data storage method for the map component data whose update propagation range data is contained, at least partially, in an area indicated by the area information contained in the map delivery request;
 a map component delivering means which sends the map component data searched for by the map component retrieving means to the communication terminal; and
 a grouping means which groups map component data retrieved by the map component retrieving means, for each item of update propagation range data associated with the map component data, wherein the map component delivering means sends the map component data to the communication terminal, for each group created by the grouping means, wherein:
 the map data further contains, for each map component, an update date and time of map component data of the map component,
 the map delivery request further contains date and time information indicating a most recent map delivery request date and time for an area, a map of which is requested to be delivered, and
 the map component retrieving means searches the map data storage method for map component data associated with update propagation range data containing map component data that belongs, at least partially, to an area indicated by the area information contained in the map delivery request, and associated with update date data indicating a date and time that is newer than the date and time information contained in the map delivery request.

5. A map data delivering device for delivering map data to a communication terminal, comprising:
 a map data storage method which stores, for each map component, map data composed of map component data of the map component, and update propagation range data containing the map component data of the map component and map component data of other map components that are affected by a change in the map component;

a map delivery request receiving means which receives from the communication terminal a map delivery request containing at least area information indicating an area, a map of which is requested to be delivered;

a map component retrieving means which searches the map data storage method for the map component data whose update propagation range data is contained, at least partially, in an area indicated by the area information contained in the map delivery request;

a map component delivering means which sends the map component data searched for by the map component retrieving means to the communication terminal; and an update notifying means which, when map data stored in the map data storage method is updated, sends an update notification to the communication terminal, the update notification containing information that indicates which map component is updated, wherein:

the map data further contains, for each map component, an update date and time of map component data of the map component, the map delivery request further contains date and time information indicating a most recent map delivery request date and time for an area, a map of which is requested to be delivered, and the map component retrieving means searches the map data storage method for map component data associated with update propagation range data containing map component data that belongs, at least partially, to an area indicated by the area information contained in the map delivery request, and associated with update date data indicating a date and time that is newer than the date and time information contained in the map delivery request.

6. A communication terminal for receiving map data that is delivered from a map data delivering device, the communication terminal comprising:

a map data storage method which manages, for each map component, map component data of the map component;

a map delivery request method which sends a map delivery request to the map data delivering device and in return receives map component data from the map data delivering device, the map delivery request containing area information and date and time information, the area information indicating an area for which a map is requested to be delivered, the date and time information indicating a most recent date and time of a map delivery request for the area;

a map data updating means which updates, for each map component, map data stored in the map data storage method by using the map component data received from the map data delivering device;

an update management data storing means which stores, for each area, update management data containing cycle information and date and time information, the cycle information indicating a cycle at which a part of the map data that belongs to the area is updated, and the date and time information indicating a most recent date and time at which a map of the area was requested to be delivered; and an update management data updating means which updates the date and time information of update management data associated with an area that is indicated by the area information contained in the map delivery request sent from the map delivery request method, according to a date and time of transmission of the map delivery request, wherein the map delivery request method monitors the update management data storing means and, when there is update management data that has passed an update cycle indicated by the cycle information since the date and time indicated by the date and time information, creates a map delivery request containing the date and time information of the update management data and area information that indicates the area associated with the update management data, and then sends the created map delivery request to the map data delivering device.

7. A communication terminal according to claim 6, wherein:

at least two areas associated with the update management data are set such that the areas have different sizes and each contain an area smaller than itself; and cycle information in the update management data associated with the at least two areas is set such that as an area contained in the update management data becomes smaller, the update cycle becomes shorter.

8. A communication terminal according to claim 6, further comprising:

a specification receiving means which receives a specification of an area and a specification of an update cycle that is associated with the specified area;

wherein the update management data updating means stores, in the update management data storing means, in association with the area received by the specification receiving means, cycle information that indicates the update cycle received by the specification receiving means.

9. A communication terminal according to claim 6, wherein:

the map delivery request method receives grouped map component data from the map data delivering device; and the map data updating means performs, for each set of grouped map component data, update processing on map data stored in the map data storage method.

10. A communication terminal according to claim 6, wherein the map data storage method manages, collectively, for each given area, map component data of the map components that belong to the area.

11. A communication terminal according to claim 10, wherein the map data storage method stores the map data in association with each of a plurality of different levels of accuracy of the given area.

12. A communication terminal according to claim 6, wherein the area is a surrounding area of a destination of route guidance or an intermediate point, and an area along the route.

13. A communication terminal according to claim 12, wherein a destination is registered as the area in the update management data storing means when at least one of the following events occur: a user sets a destination; the user arrives at a set destination; and a history of destinations set in the past is presented to the user, and the user chooses and enters one of the past destinations.

14. A communication terminal for receiving map data that is delivered from a map data delivering device, the communication terminal comprising:

a map data storage method which manages, for each map component, map component data of the map component;

a map delivery request method which sends a map delivery request to the map data delivering device and in return receives map component data from the map data delivering device, the map delivery request containing area information and date and time information, the area information indicating an area for which a map is requested to be delivered, the date and time information indicating a most recent date and time of a map delivery request for the area;

a map data updating means which updates, for each map component, map data stored in the map data storage method by using the map component data received from the map data delivering device;

an update management data storing means which stores, for each area, update management data containing cycle information and date and time information, the cycle information indicating a cycle at which a part of the map data that belongs to the area is updated, and the date and time information indicating a most recent date and time at which a map of the area is requested to be delivered;

an update management data updating means which updates the date and time information of update management data associated with an area that is indicated by the area information contained in the map delivery request sent from the map delivery request method, according to date and time of transmission of the map delivery request; and an update notification receiving means which receives an update notification from the map data delivering device, the update notification containing information that indicates an updated map component; wherein in cases where update management data stored in the update management data storing means, associated with an area containing the map component that is identified from information in the update notification received by the update notification receiving means, has passed the update cycle indicated by the cycle information since the date and time indicated by the date and time information, the map delivery request method creates a map delivery request containing the date and time information of the update management data and area information that indicates the area, and then sends the created map delivery request to the map data delivering device.

15. A map data delivering method in which a map data delivering device delivers map data to a communication terminal, the method comprising the steps of:

receiving, from the communication terminal, a map delivery request which contains area information and date and time information, the area information indicating an area for which a map is requested to be delivered, the date and time information indicating a most recent date and time when a map of the area is requested to be delivered;

searching map data for an item of map component data, the map data holding, for each map component, map component data of the map component, update date and time data of the map component data of the map component, and update propagation range data containing the map component data of the map component as well as map component data of other elements that are affected by a change in the map component, the map component data being associated with update propagation range data containing map component data that belongs, at least partially, to an area indicated by the area information contained in the map delivery request, and associated with update date and time data indicating a date and time that is newer than a date and time indicated in the date and time information contained in the map delivery request; and sending the map component data determined by the searching to the communication terminal.

16. A map data delivering device for delivering map data to a communication terminal, comprising:

a map data storage method which stores, for each map component, map data composed of map component data of the map component, and update propagation range data containing the map component data of the map component and map component data of other map components that are affected by a change in the map component;

a map delivery request receiving means which receives from the communication terminal a map delivery request containing at least area information indicating an area, a map of which is requested to be delivered;

a map component retrieving means which searches the map data storage method for the map component data whose update propagation range data is contained, at least partially, in an area indicated by the area information contained in the map delivery request; and a map component delivering means which sends the map component data searched for by the map component retrieving means to the communication terminal, wherein the map data is sorted according to accuracy of coordinates or by map component type; the map delivery request further contains information specifying the accuracy of the coordinates of an area of a map that is requested to be delivered, or information specifying map component type, and the map component retrieving means searches the map data storage method for map component data having the accuracy or the type that is contained in the map delivery request.

17. A map data delivering device according to claim 16, wherein: a surrounding area of a destination or of an intermediate point, and an area along a route are set as the area; and for the surrounding area of the destination or of the intermediate point, the map data storage method is searched for map component data that has higher coordinate accuracy or more map component types than map component data that is retrieved for the area along the route.

18. A map data delivering device for delivering map data to a communication terminal, comprising:

a map data storage method which stores, for each map component, map data composed of map component data of the map component, and update propagation range data containing the map component data of the map component and map component data of other map components that are affected by a change in the map component;

a map delivery request receiving means which receives from the communication terminal a map delivery request containing at least area information indicating an area, a map of which is requested to be delivered;

a map component retrieving means which searches the map data storage method for the map component data whose update propagation range data is contained, at least partially, in an area indicated by the area information contained in the map delivery request; and a map component delivering means which sends the map component data searched for by the map component retrieving means to the communication terminal, wherein the map data is managed on a mesh cell basis and further contains, for each map component, update date and time data of map component data of the map component;

the map delivery request further contains date and time information indicating a most recent map delivery request date and time for an area, a map of which is requested to be delivered, the map component retrieving means searches the map data storage method for map component data that is associated with update propagation range data containing map component data that belongs, at least partially, to an area indicated by the area information contained in the map delivery request, and is associated with update date and time data indicating a date and time that is newer than the date and time indicated in the date and time information contained in the map delivery request, and the map delivery request further performs search on other mesh cells where the map component data determined by the map component retrieving means is present.

19. A map data delivering device according to claim 18, wherein an upper limit is set to mesh count, or length and width, for performing update propagation to adjacent mesh cells.

* * * * *